(12) United States Patent
von Flotow et al.

(10) Patent No.: US 11,235,892 B2
(45) Date of Patent: Feb. 1, 2022

(54) AIRCRAFT RETRIEVAL SYSTEM AND METHOD

(71) Applicant: Hood Technology Corporation, Hood River, OR (US)

(72) Inventors: Andreas H. von Flotow, Hood River, OR (US); Corydon C. Roeseler, Hood River, OR (US); Caleb A. Woodruff, The Dalles, OR (US); Benjamin T. Ketler, Hood River, OR (US)

(73) Assignee: Hood Technology Corporation, Hood River, OR (US)

( * ) Notice: Subject to any disclaimer, the term of this patent is extended or adjusted under 35 U.S.C. 154(b) by 0 days.

(21) Appl. No.: 16/874,841

(22) Filed: May 15, 2020

(65) Prior Publication Data

US 2020/0369406 A1 Nov. 26, 2020

Related U.S. Application Data

(60) Provisional application No. 62/851,360, filed on May 22, 2019.

(51) Int. Cl.
*B64F 1/02* (2006.01)
*B66D 1/74* (2006.01)

(52) U.S. Cl.
CPC ............ *B64F 1/029* (2020.01); *B64F 1/0295* (2020.01); *B64F 1/0299* (2020.01); *B66D 1/7489* (2013.01)

(58) Field of Classification Search
CPC ...... B64F 1/029; B64F 1/0295; B64F 1/0299; B66D 1/7489; B64C 27/48; B64C 25/08; B64C 27/001; B64C 27/08; B64C 27/26; B64C 27/32
See application file for complete search history.

(56) References Cited

U.S. PATENT DOCUMENTS

| 968,339 A | 8/1910 | Geraldson |
| 1,144,505 A | 6/1915 | Steffan |
| 1,306,860 A | 6/1919 | Smith |
| 1,383,595 A | 7/1921 | Black |
| 1,499,472 A | 7/1924 | Pratt |
| 1,582,188 A | 4/1926 | Mummert |
| 1,625,020 A | 4/1927 | Guillermo |
| 1,686,298 A | 10/1928 | Uhl |
| 1,716,670 A | 6/1929 | Sperry |
| 1,731,091 A | 10/1929 | Clayton |
| 1,748,663 A | 2/1930 | Tucker |
| 1,836,010 A | 12/1931 | Audrain |

(Continued)

FOREIGN PATENT DOCUMENTS

| CA | 781808 A | 4/1968 |
| CA | 839101 A | 4/1970 |

(Continued)

OTHER PUBLICATIONS

"Bell QTR Quad Tiltrotor", Aviastar (3 pages), Jul. 27, 2015.

(Continued)

*Primary Examiner* — Justin M Benedik
(74) *Attorney, Agent, or Firm* — Neal, Gerber & Eisenberg LLP

(57) ABSTRACT

The present disclosure describes various systems, devices, and methods configured to retrieve a fixed-wing aircraft from free flight using a flexible capture member and a monopole assembly.

28 Claims, 28 Drawing Sheets

(56) References Cited

U.S. PATENT DOCUMENTS

| | | | |
|---|---|---|---|
| 1,848,828 A | 3/1932 | Griffin | |
| 1,912,723 A | 6/1933 | Perkins | |
| 2,285,789 A | 6/1942 | Woolley | |
| 2,415,071 A | 2/1947 | Brie | |
| 2,435,197 A | 2/1948 | Brodie | |
| 2,440,574 A | 4/1948 | Cotton | |
| 2,448,209 A | 8/1948 | Boyer et al. | |
| 2,488,050 A | 11/1949 | Brodie | |
| 2,488,051 A | 11/1949 | Brodie | |
| 2,552,115 A | 5/1951 | Replogle | |
| 2,807,429 A | 9/1957 | Hawkins et al. | |
| 2,843,337 A | 7/1958 | Bennett | |
| 2,851,235 A | 9/1958 | Seymour | |
| 2,944,815 A | 7/1960 | Moyer | |
| 3,017,138 A | 1/1962 | Flint | |
| 3,029,049 A | 4/1962 | Melville | |
| 3,146,974 A | 9/1964 | Petoia | |
| 3,346,313 A | 10/1967 | Fee | |
| 3,351,325 A | 11/1967 | Cotton | |
| 3,389,880 A | 6/1968 | Ferguson | |
| 3,456,141 A | 7/1969 | Burgess | |
| 3,659,892 A | 5/1972 | Briggs | |
| 3,785,316 A | 1/1974 | Leming et al. | |
| 3,980,259 A | 9/1976 | Greenhalgh et al. | |
| 3,987,746 A | 10/1976 | Mcculloh | |
| 4,079,901 A | 3/1978 | Mayhew et al. | |
| 4,116,408 A | 9/1978 | Soloy | |
| 4,123,020 A | 10/1978 | Korsak | |
| 4,147,317 A | 4/1979 | Mayhew et al. | |
| 4,255,084 A | 3/1981 | Mouille et al. | |
| 4,267,987 A * | 5/1981 | McDonnell | B64D 39/00 |
| | | | 244/137.4 |
| 4,311,290 A | 1/1982 | Koper | |
| 4,313,582 A | 2/1982 | Hasquenoph et al. | |
| 4,410,151 A | 10/1983 | Hoeppner et al. | |
| 4,523,729 A | 6/1985 | Frick | |
| 4,575,026 A | 3/1986 | Brittain et al. | |
| 4,680,962 A | 7/1987 | Durbin | |
| 4,738,414 A | 4/1988 | McCulloh | |
| 4,753,400 A | 6/1988 | Reuter et al. | |
| 4,757,959 A | 7/1988 | Schroeder et al. | |
| 4,790,497 A | 12/1988 | Yoffe | |
| 4,842,222 A | 6/1989 | Baird | |
| 5,000,398 A * | 3/1991 | Rashev | B64C 27/08 |
| | | | 244/110 E |
| 5,039,034 A | 8/1991 | Burgess et al. | |
| 5,042,750 A | 8/1991 | Winter | |
| 5,054,717 A | 10/1991 | Taylor | |
| 5,092,540 A | 3/1992 | Burgess et al. | |
| 5,647,726 A | 7/1997 | Sehgal et al. | |
| 5,687,930 A | 11/1997 | Wagner et al. | |
| 5,799,900 A | 9/1998 | McDonnell | |
| 5,806,795 A | 9/1998 | Ortelli | |
| 6,202,517 B1 | 3/2001 | Dolan | |
| 6,264,140 B1 | 7/2001 | McGeer et al. | |
| 6,824,102 B2 | 11/2004 | Haggard | |
| 6,874,729 B1 | 4/2005 | McDonnell | |
| 6,961,018 B2 | 11/2005 | Heppe et al. | |
| 7,000,883 B2 | 2/2006 | Mercadal et al. | |
| 7,028,947 B2 | 4/2006 | Burns | |
| 7,059,564 B2 | 6/2006 | Dennis | |
| 7,066,430 B2 * | 6/2006 | Dennis | B64C 39/024 |
| | | | 244/110 F |
| 7,090,166 B2 * | 8/2006 | Dennis | B64C 39/024 |
| | | | 244/63 |
| 7,097,137 B2 | 8/2006 | McDonnell | |
| 7,104,495 B2 * | 9/2006 | McGeer | B64F 1/06 |
| | | | 244/1 R |
| 7,114,680 B2 * | 10/2006 | Dennis | B64C 39/024 |
| | | | 244/63 |
| 7,121,507 B2 * | 10/2006 | Dennis | B64C 39/024 |
| | | | 244/110 F |
| 7,128,294 B2 * | 10/2006 | Roeseler | B64C 39/024 |
| | | | 244/49 |
| 7,140,575 B2 * | 11/2006 | McGeer | B64C 39/024 |
| | | | 244/63 |
| 7,143,974 B2 | 12/2006 | Roeseler et al. | |
| 7,143,976 B2 | 12/2006 | Snediker et al. | |
| 7,152,827 B2 | 12/2006 | McGeer | |
| 7,165,745 B2 | 1/2007 | McGeer et al. | |
| 7,175,135 B2 * | 2/2007 | Dennis | B64F 1/06 |
| | | | 244/110 C |
| 7,210,654 B1 | 5/2007 | Cox et al. | |
| 7,219,856 B2 | 5/2007 | Watts et al. | |
| 7,264,204 B1 | 9/2007 | Portmann | |
| 7,344,108 B2 | 3/2008 | Muylaert et al. | |
| 7,360,741 B2 | 4/2008 | McGeer et al. | |
| 7,410,125 B2 | 8/2008 | Steele | |
| 7,464,650 B2 | 12/2008 | Steinkerchner et al. | |
| 7,510,145 B2 | 3/2009 | Snediker | |
| 7,530,527 B2 * | 5/2009 | Kelleher | B64C 37/02 |
| | | | 244/2 |
| 7,543,780 B1 | 6/2009 | Marshall et al. | |
| 7,562,843 B2 | 7/2009 | Lipponen | |
| 7,578,467 B2 | 8/2009 | Goodrich | |
| 7,581,702 B2 | 9/2009 | Olson et al. | |
| 7,602,415 B2 | 10/2009 | Von et al. | |
| 7,665,691 B2 | 2/2010 | Hanzlick et al. | |
| 7,712,702 B2 | 5/2010 | McGeer et al. | |
| 7,798,445 B2 | 9/2010 | Heppe et al. | |
| 7,806,366 B2 | 10/2010 | Jackson | |
| 7,876,359 B2 | 1/2011 | Von et al. | |
| 7,883,059 B2 | 2/2011 | Kunz | |
| 7,954,758 B2 | 6/2011 | McGeer et al. | |
| 8,091,833 B2 | 1/2012 | Von et al. | |
| 8,140,200 B2 | 3/2012 | Heppe et al. | |
| 8,162,256 B2 * | 4/2012 | Goossen | B64C 39/024 |
| | | | 244/110 E |
| 8,172,177 B2 | 5/2012 | Lovell et al. | |
| 8,226,039 B2 | 7/2012 | Von et al. | |
| 8,231,083 B2 | 7/2012 | Kutzmann et al. | |
| 8,245,968 B2 | 8/2012 | McGeer et al. | |
| 8,276,844 B2 | 10/2012 | Kariv | |
| 8,292,215 B2 * | 10/2012 | Olm | B64C 39/024 |
| | | | 244/17.23 |
| 8,313,057 B2 | 11/2012 | Rednikov | |
| 8,348,193 B2 | 1/2013 | McGeer et al. | |
| 8,405,723 B2 | 3/2013 | Von et al. | |
| 8,453,966 B2 | 6/2013 | McGeer et al. | |
| 8,464,981 B2 | 6/2013 | Goldie et al. | |
| 8,573,536 B2 | 11/2013 | McGeer et al. | |
| 8,596,576 B1 | 12/2013 | McGeer et al. | |
| 8,672,264 B1 | 3/2014 | McGeer et al. | |
| 8,708,277 B1 | 4/2014 | McGeer et al. | |
| 8,708,278 B2 | 4/2014 | McGeer et al. | |
| 8,714,482 B2 | 5/2014 | McGeer et al. | |
| 8,740,134 B2 | 6/2014 | Suzuki | |
| 8,740,142 B2 | 6/2014 | McGeer et al. | |
| 8,774,982 B2 | 7/2014 | Oakley et al. | |
| 8,944,373 B2 | 2/2015 | Dickson et al. | |
| 8,950,698 B1 | 2/2015 | Rossi | |
| 8,955,800 B2 * | 2/2015 | McGeer | B64F 1/04 |
| | | | 244/110 E |
| 8,955,801 B2 | 2/2015 | McGeer et al. | |
| 8,991,793 B1 | 3/2015 | Bernhardt | |
| 9,004,402 B2 | 4/2015 | McGeer et al. | |
| 9,010,683 B2 | 4/2015 | Gundlach et al. | |
| 9,132,916 B2 | 9/2015 | Hanna et al. | |
| 9,193,481 B2 | 11/2015 | McGeer et al. | |
| 9,242,714 B2 | 1/2016 | Wang et al. | |
| 9,260,184 B2 | 2/2016 | Olm et al. | |
| 9,266,609 B1 | 2/2016 | Kunz | |
| 9,290,269 B2 * | 3/2016 | Walker | B64C 39/024 |
| 9,340,301 B2 | 5/2016 | Dickson et al. | |
| 9,359,075 B1 | 6/2016 | Von Flotow et al. | |
| 9,434,481 B2 | 9/2016 | McGeer | |
| 9,442,496 B1 | 9/2016 | Beckman et al. | |
| 9,456,185 B2 | 9/2016 | Oakley et al. | |
| 9,527,588 B1 | 12/2016 | Rollefstad | |
| 9,573,683 B2 | 2/2017 | Martin et al. | |
| 9,623,969 B2 | 4/2017 | Nelson | |
| 9,630,712 B1 | 4/2017 | Carmack et al. | |
| 9,630,713 B1 | 4/2017 | Von Novak, III | |

(56) References Cited

U.S. PATENT DOCUMENTS

| | | |
|---|---|---|
| 9,637,245 B2 | 5/2017 | Yoffe |
| 9,656,765 B2 | 5/2017 | Von Flotow et al. |
| 9,685,091 B2 | 6/2017 | Hayes |
| 9,688,404 B1 | 6/2017 | Buchmueller et al. |
| 9,751,625 B2 | 9/2017 | Phan et al. |
| 9,816,816 B2 | 11/2017 | Hayes |
| D806,607 S | 1/2018 | Zhydanov |
| 9,856,036 B2 | 1/2018 | Dickson et al. |
| 9,896,222 B2 | 2/2018 | Kunz et al. |
| 10,053,236 B1 | 8/2018 | Buchmueller et al. |
| 10,054,943 B2 | 8/2018 | Sapp et al. |
| 10,370,120 B1 | 8/2019 | McGann et al. |
| 10,518,902 B2 | 12/2019 | Briggs et al. |
| 2002/0100838 A1* | 8/2002 | McGeer ............... B64F 1/0295 244/116 |
| 2003/0222173 A1 | 12/2003 | McGeer et al. |
| 2004/0256519 A1 | 12/2004 | Ellis et al. |
| 2005/0017129 A1 | 1/2005 | McDonnell |
| 2005/0178894 A1 | 8/2005 | McGeer et al. |
| 2008/0210809 A1 | 9/2008 | Ariton et al. |
| 2009/0079113 A1 | 3/2009 | Martin |
| 2009/0224097 A1 | 9/2009 | Kariv |
| 2009/0283629 A1 | 11/2009 | Kroetsch et al. |
| 2010/0025528 A1 | 2/2010 | Jackson |
| 2010/0187922 A1 | 7/2010 | Sheppard et al. |
| 2010/0295321 A1 | 11/2010 | Bevirt |
| 2010/0296930 A1 | 11/2010 | Girard et al. |
| 2010/0296931 A1 | 11/2010 | Girard |
| 2011/0062281 A1 | 3/2011 | Woolley et al. |
| 2011/0175604 A1 | 7/2011 | Polzer et al. |
| 2011/0204074 A1 | 8/2011 | Gelardi et al. |
| 2011/0269332 A1 | 11/2011 | Kim et al. |
| 2012/0056041 A1 | 3/2012 | Rhee et al. |
| 2012/0223182 A1* | 9/2012 | Gilchrist, III ......... B64F 1/0297 244/110 F |
| 2013/0068892 A1 | 3/2013 | Bin et al. |
| 2013/0084183 A1 | 4/2013 | Yuce et al. |
| 2013/0105635 A1 | 5/2013 | Alzu'bi et al. |
| 2013/0161447 A1 | 6/2013 | McGeer et al. |
| 2014/0138477 A1 | 5/2014 | Keennon et al. |
| 2014/0222246 A1 | 8/2014 | Mohamadi |
| 2014/0240498 A1 | 8/2014 | Ohtomo et al. |
| 2014/0263852 A1 | 9/2014 | Walker et al. |
| 2014/0339355 A1 | 11/2014 | Olm et al. |
| 2015/0014477 A1 | 1/2015 | Yoshizaki et al. |
| 2015/0129716 A1 | 5/2015 | Yoffe |
| 2015/0259066 A1 | 9/2015 | Johannesson et al. |
| 2015/0314871 A1 | 11/2015 | Flotow |
| 2016/0023760 A1* | 1/2016 | Goodrich ................. G05D 1/12 244/10 |
| 2016/0114906 A1* | 4/2016 | McGeer ............... B64C 39/024 244/63 |
| 2016/0144980 A1 | 5/2016 | Kunz et al. |
| 2016/0221683 A1 | 8/2016 | Roberts et al. |
| 2016/0327945 A1 | 11/2016 | Davidson |
| 2017/0029099 A1 | 2/2017 | Chen |
| 2017/0036762 A1 | 2/2017 | Gamble et al. |
| 2017/0072812 A1 | 3/2017 | Von Novak et al. |
| 2017/0139409 A1 | 5/2017 | Clarke |
| 2017/0225784 A1* | 8/2017 | Hayes ...................... B64D 5/00 |
| 2017/0274997 A1 | 9/2017 | Von Flotow et al. |
| 2017/0297738 A1 | 10/2017 | Von Flotow et al. |
| 2017/0327221 A1 | 11/2017 | Von Flotow et al. |
| 2017/0369185 A1 | 12/2017 | Grubb |
| 2018/0040316 A1 | 2/2018 | Beckman et al. |
| 2018/0050823 A1 | 2/2018 | McGeer |
| 2018/0162528 A1* | 6/2018 | McGrew ................ B64C 27/08 |
| 2018/0327093 A1 | 11/2018 | Von Flotow et al. |
| 2018/0327113 A1* | 11/2018 | von Flotow .............. F15B 1/26 |
| 2019/0033889 A1 | 1/2019 | Von Flotow et al. |
| 2019/0071176 A1 | 3/2019 | Von Flotow et al. |
| 2019/0291859 A1 | 9/2019 | Manning |
| 2020/0156790 A1 | 5/2020 | Von Flotow et al. |

FOREIGN PATENT DOCUMENTS

| | | |
|---|---|---|
| CN | 204822072 U | 12/2015 |
| EP | 0472613 B1 | 3/1992 |
| EP | 2186728 A1 | 5/2010 |
| GB | 2071031 A | 9/1981 |
| WO | 0075014 A1 | 12/2000 |
| WO | WO0075014 * | 12/2000 |
| WO | 0107318 A1 | 2/2001 |
| WO | 2008015663 A1 | 2/2008 |
| WO | 2010138265 A1 | 12/2010 |
| WO | 2013171735 A1 | 11/2013 |
| WO | 2014204550 A2 | 12/2014 |
| WO | 2016167849 A1 | 10/2016 |
| WO | 2018222551 A1 | 12/2018 |
| WO | WO2018222551 * | 12/2018 |

OTHER PUBLICATIONS

"Flexrotor Long-Endurance VTOL Aircraft Transitions to Wing-Borne Flight", Aerovel, http://www.aerovelco.com/papers/FlexrotorTransitionsAnnouncement.pdf (2 pages), Aug. 4, 2011.

"Rotary Action", Pigasus Press, Description of Scene of License to Kill, http://www.rotaryaction.com/pages/licetkil.html, 2014 (2 pages).

"Screen captures from YouTube video clip entitled "RC glider launched"", 20 pages, uploaded on Sep. 11, 2016 by user "carrier drone". Retrieved from Internet https://www.youtube.com/watch?v=cAyDJBosNul&feature=youtu.be.

"Skyhook (Harrier Handling System)", www.harpoondatabases.com/encyclopedia/Entry2979.aspx (3 pages), Jun. 21, 2013.

"The Beartrap—A Canadian Invention", Originally published in Crowsnest Magazine—vol. 17, Nos. 3 and 4 (Mar.-Apr. 1965); retrieved at http://www.readayeready.com/timeline/1960s/beartrap/index.htm>, retrieved on Sep. 14, 2007 (4 pages).

"Trapeze", Wikipedia, available at http://en.wikipedia.org/w/index.php?title=Trapeze&oldid=67584367 as of Aug. 4, 2006 (2 pages).

Dickard, H. E., "Mini-RPV Recovery System Conceptual Study", Teledyne Ryan Aeronautical, Prepared for Eustis Directorate, U.S. Army Air Mobility Research and Development Laboratory, Aug. 1977 (322 pages).

Durbin, Enoch, et al., "An Airspeed Vector Sensor for V/STOL Aircraft", Journal of Aircraft, vol. 19, No. 6, Jun. 1982 (7 pages), 449-455.

Hendrickson, Stephen P., et al., "A Miniature Powerplant for Very Small, Very Long Range Autonomous Aircraft", Final Report to the United States Department of Energy under contract No. DE-FG03-96ER82187 (Phase II SBIR) (23 pages), Sep. 29, 1999.

Holland, Greg J., et al., "Autonomous Aerosondes for Economical Atmospheric Soundings Anywhere on the Globe", Bulletin of the American Meteorological Society, vol. 73, No. 12, Dec. 1992 (12 pages).

McGeer, Tad, "Aerosonde Hazard Estimation", The Insitu Group, 1994 (7 pages).

McGeer, Tad, "Aerosonde Pacific Reconnaissance: Ready When You Are!", The Insitu Group, Pacific Northwest WeatherWorkshop, Mar. 2005 (15 pages).

McGeer, Tad, "Laima: the First Atlantic Crossing By Unmanned Aircraft", The Insitu Group (25 pages).

McGeer, Tad, et al., "Quantitative Risk Management as a Regulatory Approach To Civil UAVS", International Workshop on UAV Certification, Jun. 1999 (11 pages).

McGeer, Tad, "Regulatory Issues Involving Long-Range Weather Observation By Aerosonde Autonomous Aircraft", The Insitu Group (8 pages).

McGeer, Tad, "Safety, Economy, Reliability, and Regulatory Policy for Unmanned Aircraft", www.aerovelco.com, Mar. 2007 (9 pages).

McGeer, Tad, et al., "Wide-Scale Use of Long-Range Miniature Aerosondes Over the World's Oceans", available at www.aerovelco.com/papers/McGeerVagners99.mht, 1999 (25 pages).

Mullens, Katherine, et al., "Automated Launch, Recovery, and Refueling for Small Unmanned Aerial Vehicles", 2004 (11 pages).

(56) References Cited

OTHER PUBLICATIONS

"International Search Report and Written Opinion", European Patent Office acting as International Searching Authority in PCT/US2020/033369 (14 pages), dated Aug. 18, 2020.

"First Office Action", from corresponding Canadian Patent Application No. 3,3137,585, dated Nov. 26, 2021.

* cited by examiner

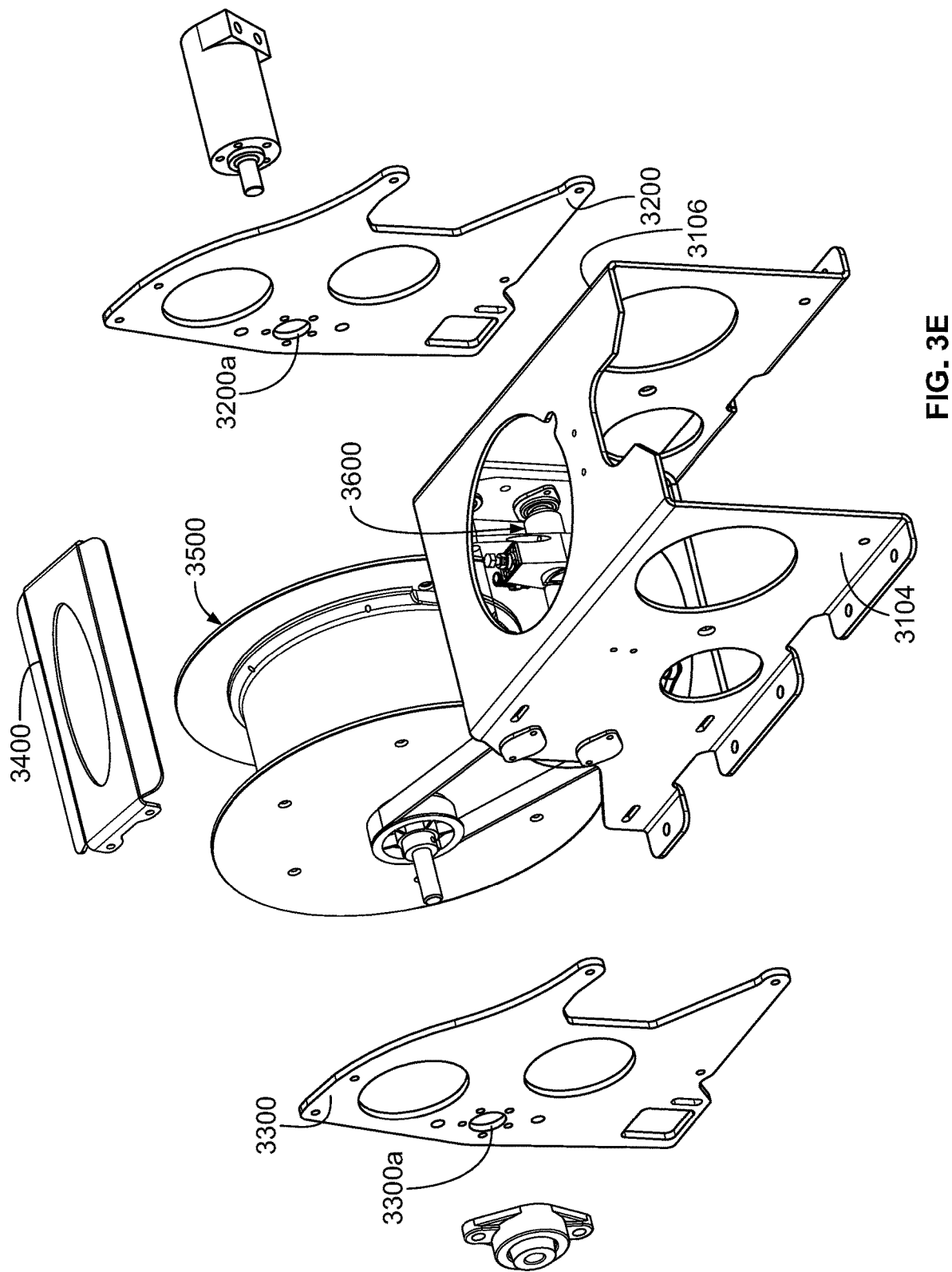

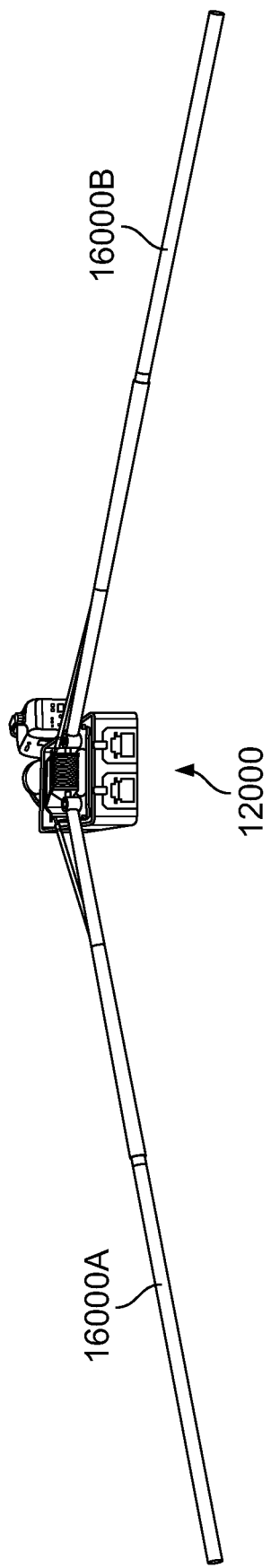

AIRCRAFT RETRIEVAL SYSTEM AND METHOD

PRIORITY CLAIM

This application claims priority to and the benefit of U.S. Provisional Patent Application No. 62/851,360, which was filed on May 22, 2019, the entire contents of which is incorporated herein by reference.

BACKGROUND

Aircraft capable of long-distance, efficient cruising flight typically require long runways for take-off and landing. This limits the locations from which the aircraft can take-off and at which the aircraft can land, since many locations don't have sufficient space for a runway. There is a continuing need for new systems and methods that eliminate the need for these aircraft to use long runways to take-off and land.

In one known system, a rope is extended in an upright orientation between a first device at a high point and a second device at a low point. A fixed-wing aircraft is then flown such that it contacts the rope with its wing between the high point and the low point, thereby enabling the aircraft to capture the rope. The contact between the fixed-wing aircraft and the rope can involve relatively high forces that must be absorbed by the system to stop the fixed-wing aircraft. Depending on where along the rope the fixed-wing aircraft makes contact, the force may be absorbed more by either the first device or the second device. When the fixed-wing aircraft makes contact toward the high point, the first device must absorb a large percentage of the imparted force from the contact. When the first device is a multi-copter, such force requires the multi-copter to expend more energy to remain in flight and support the rope and captured fixed-wing aircraft. Alternatively, when the fixed-wing aircraft makes contact toward the low point, more of the impact force is applied to the second device. When the second device is a tall structure, with a height exceeding that of the fixed-wing aircraft wingspan for which it is configured to retrieve, for example, to keep the fixed-wing aircraft a safe distance above the surface, post-retrieval, the risk of tipping over increases. Thus, there is a need for improved aircraft retrieval devices that address these issues.

BRIEF SUMMARY

Various embodiments of the present disclosure provide systems and methods for retrieving a fixed-wing aircraft from free flight that address the above described issues.

One example system of the present disclosure includes: (1) a lifting device used to raise a first end of a flexible capture member to a predetermined height; and (2) an aircraft retrieval device including a tensioning device (such as a downhaul winch) coupled to the second end of the flexible capture member and a monopole assembly positioned above the tensioning device. The flexible capture member extends through the monopole assembly. In various embodiments, the aircraft retrieval device further includes a storage assembly usable to store the monopole assembly, tensioning device, and flexible capture member when disassembled, and to provide a platform on which the monopole assembly and tensioning device are supported during capture of the fixed-wing aircraft. In certain example embodiments, the base of the monopole assembly may be articulatable, and in other example embodiments, the monopole itself may be articulatable, while in still other example embodiments both the monopole and the base of the monopole assembly are articulatable. This may further minimize the footprint and mass of the equipment.

One example method of the present disclosure employs a downhaul winch, the monopole assembly, the flexible capture member, and the lifting device to capture the fixed-wing aircraft and lower it toward the ground. More specifically, to retrieve the fixed-wing aircraft from free, wing-borne flight, the method includes: (1) attaching a free end of the flexible capture member to the lifting device (e.g., a rotorcraft, crane, boom, parachute, etc.)) such that the flexible capture member extends from a drum of the downhaul winch through the monopole assembly to the lifting device; (2) controlling the lifting device to raise the first end of the flexible capture member to a designated altitude above the monopole assembly, the downhaul winch, and the storage assembly; (3) controlling the fixed-wing aircraft to contact and capture the flexible capture member, preferably at a position relatively close to the monopole assembly; and (4) controlling the lifting device to descend such that the fixed-wing aircraft is lowered and supported by the monopole assembly in its most-upright position.

Additional features and advantages of the present disclosure are described in, and will be apparent from, the following Detailed Description and the Figures.

BRIEF DESCRIPTION OF THE SEVERAL VIEWS OF THE DRAWINGS

FIGS. 3D and 3E are partially exploded top perspective views of the downhaul winch of FIGS. 3A and 3B shown with certain components removed.

FIG. 6B is another perspective view of the example aircraft retrieval device of FIG. 6A, with the monopole assembly removed and shown supported by one of the storage assemblies of the present disclosure.

DETAILED DESCRIPTION

Figure 1A:
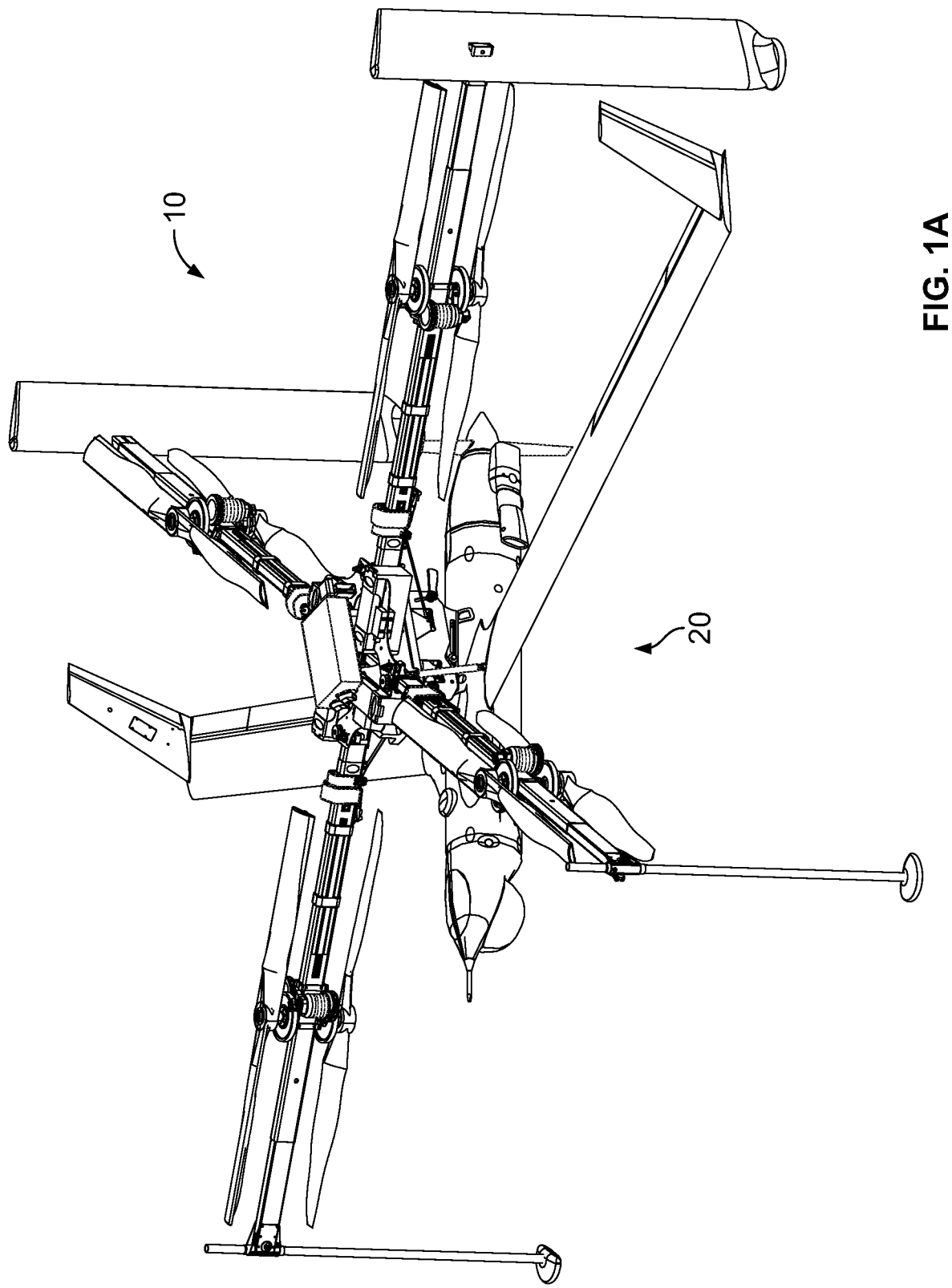
FIG. 1A is a top perspective view of an example multi-copter of one example embodiment of the present disclosure and an example fixed-wing aircraft of one example embodiment of present disclosure and shown attached to the multi-copter.
Figure 1B:
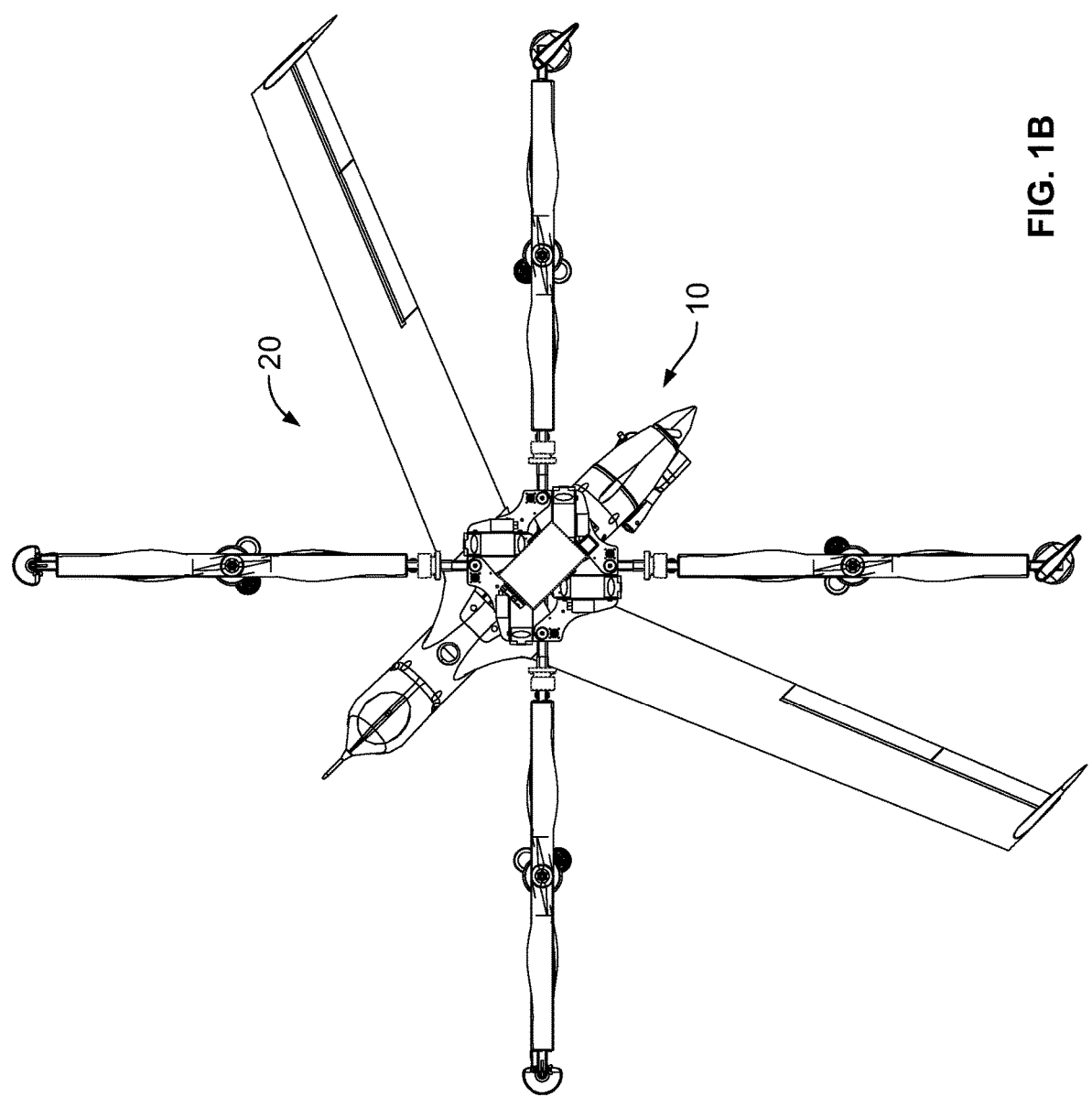
FIG. 1B is a top plan view of the multi-copter and the fixed-wing aircraft of FIG. 1A.
Figure 1C:
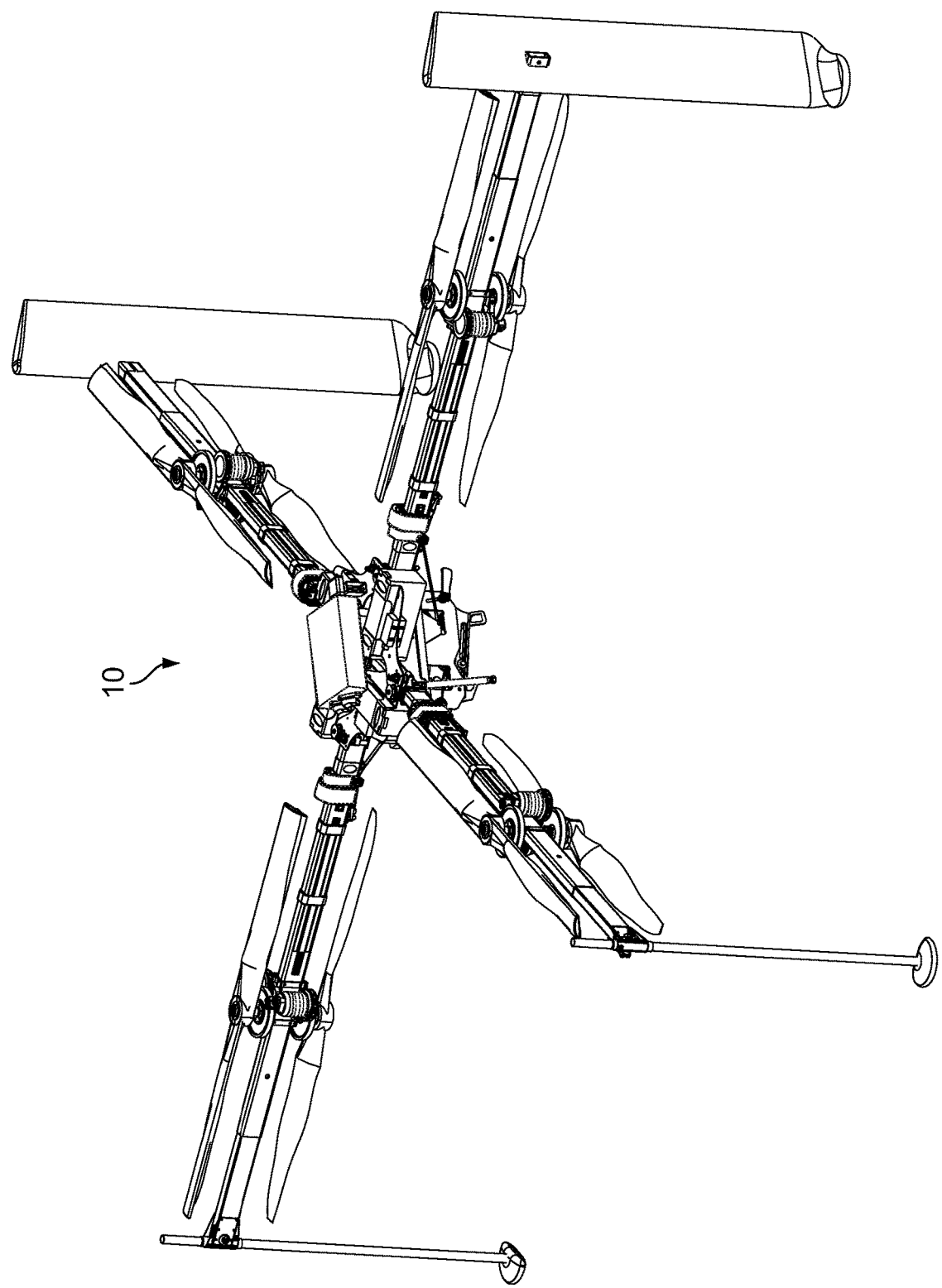
FIG. 1C is a top perspective view of the multi-copter of FIG. 1A.
Figure 1D:
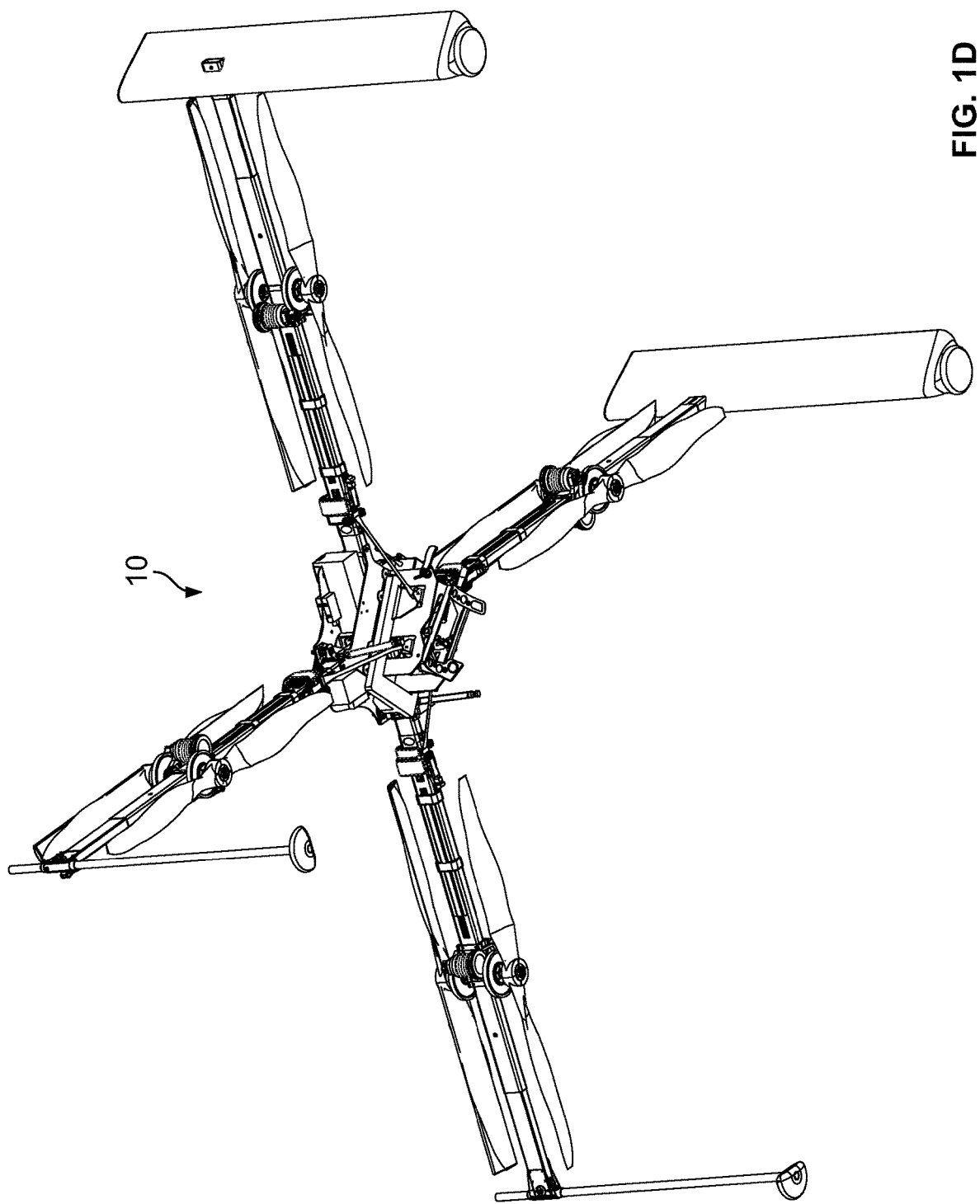
FIG. 1D is a bottom perspective view of the multi-copter of FIG. 1A.

While the features, methods, devices, and systems described herein may be embodied in various forms, there are shown in the drawings, and will hereinafter be described, some exemplary and non-limiting embodiments. Not all of the depicted components described in this disclosure may be required, however, and some implementations may include additional, different, or fewer components from those expressly described in this disclosure. Variations in the arrangement and type of the components; the shapes, sizes, and materials of the components; and the manners of attachment and connections of the components may be made without departing from the spirit or scope of the claims as set forth herein. This specification is intended to be taken as a whole and interpreted in accordance with the principles of the disclosure as taught herein and understood by one of ordinary skill in the art. The drawings are not to scale unless noted otherwise.

The present disclosure describes various systems, devices, and methods for retrieving a fixed-wing aircraft from free flight. At a relatively abstract level, the aircraft retrieval system of the present disclosure operates by raising a first end of a flexible capture member to a predetermined height (such as by, but not limited to, using a multi-copter), and coupling a second end of the flexible capture member to a second device on the ground (such as but not limited to a winch). The fixed-wing aircraft is then controlled to contact the flexible capture member between the first and the second ends of the flexible member, whereby the fixed-wing aircraft captures the flexible capture member and is thereafter lowered toward the ground.

In many situations, it is beneficial for the fixed-wing aircraft to contact the flexible capture member as close to the ground or second end of the flexible capture member as possible. The fixed-wing aircraft may operate using guidance information based on a GPS receiver positioned in a base of the aircraft retrieval device, which is positioned near the second end of the flexible capture member. The first end (or high end) of the flexible capture member may sway or move in the air due to wind and movement of the multi-copter. This movement is reduced near the second end (or low end) of the flexible capture member. When the fixed-wing aircraft attempts to make contact near the low end, it has an increased likelihood of actually making contact with the flexible capture member at an expected location relative to the aircraft retrieval device, and at an expected span-wise position on the aircraft wing. Additionally, it is beneficial for the fixed-wing aircraft to contact the flexible capture member close to the low end to reduce the flight time required of the multi-copter. After the fixed-wing aircraft captures the flexible capture member, the aircraft and flexible capture member are fully supported by the multi-copter. This requires the multi-copter to use additional energy to remain in flight. When the fixed-wing aircraft captures the flexible capture member close to the low end, the amount of time required to lower the aircraft is less than when the fixed-wing aircraft captures the flexible capture member close to the high end. A further benefit relates to the relative ability of the multi-copter and the downhaul winch to absorb the energy from the impact of the fixed-wing aircraft on the flexible capture member. The multi-copter is less able to absorb impact energy than the downhaul winch. As such, it is beneficial for the fixed-wing aircraft to contact the flexible capture member closer to the low end where the downhaul winch is position, such that a greater portion of the impact energy is transferred to the downhaul winch.

One drawback of controlling the fixed-wing aircraft to contact the flexible capture member at a relatively low height is that the fixed-wing aircraft imparts a high overturning moment on the structure on the ground. If the ground structure is too rigid and/or insufficiently ballasted, it can tip over when the impact energy is transferred through the flexible capture member.

As described in further detail below and with respect to the Figures, the issues discussed above are addressed by the example aircraft retrieval system disclosed herein. To mitigate the issue of tipping over, and to take advantage of the benefits of a low contact point on the flexible capture member, various example embodiments of the aircraft retrieval system of the present disclosure include: (1) a lifting device configured to raise the first end of the flexible capture member to a predetermined height above an example aircraft retrieval device, and (2) an aircraft retrieval device including a monopole assembly such as an articulatable monopole assembly.

The lifting device may be any suitable device configured to raise the first end of the flexible capture member. For example, the lifting device may be a multi-copter, crane, boom, aircraft, parachute, or other device. In the embodiment shown in the Figures, the lifting device is a multi-copter 10. As such, the multi-copter 10 is described in further detail below. However, it should be appreciated that the lifting device may be any other suitable device for raising the first end of the flexible capture member.

The illustrated example aircraft retrieval device includes a storage assembly 2000, a downhaul winch 3000, an articulatable monopole assembly 4000, and a flexible capture member 5000. These example elements are disclosed in further detail below with respect to the Figures.

1. Multi-Copter

FIGS. 1A, 1B, 1C, and 1D show one example multi-copter indicated by numeral 10. The multi-copter 10 is modular in that it is assembled from (and can be disassembled into) a plurality of different modules or subassemblies. The multi-copter 10 is removably attachable to: (1) the fixed-wing aircraft 20 (to facilitate launch of the fixed-wing aircraft 20 into free, wing-borne flight), and (2) the downhaul winch 3000 via the flexible capture member 5000 (for retrieval of the multi-copter 10 following launch of the fixed-wing aircraft 20, and retrieval of both the fixed-wing aircraft and multi-copter 10 after the fixed-wing aircraft 20 has captured the flexible capture member 5000).

While the multi-copter 10 includes eight rotors in the example embodiments described below and shown in FIGS. 1A-D, the aircraft retrieval system may include any suitable rotorcraft including any suitable quantity of rotors, such as one rotor, two rotors, or four rotors.

The multi-copter 10 includes several modules or subassemblies, including: a hub module; first, second, third, and fourth rotor arm modules; first and second front landing gear extension modules; first and second rear landing gear extension modules; first and second front landing gear modules; and first and second rear landing gear modules.

As described in detail below, to assemble the multi-copter 10 from these modules or subassemblies, after removing the modules from the container of the storage assembly 2000, an operator: (1) attaches the first, second, third, and fourth rotor arm modules to the hub module; (2) attaches the first and second front landing gear extension modules to the first and second rotor arm modules, respectively; (3) attaches the first and second rear landing gear extension modules to the third and fourth rotor arm modules, respectively; (4) attaches the first and second front landing gear module to the first and second front landing gear extension modules, respectively; and (5) attaches the first and second rear landing gear module to the first and second rear landing gear extension modules, respectively.

The modularity of this multi-copter is beneficial compared to non-modular or unitary multi-copter construction. First, the modularity of this multi-copter enables an operator to quickly and easily disassemble this relatively large multi-copter into smaller modules or subassemblies. The operator can compactly store these modules or subassemblies into a single container, which makes the disassembled multi-copter easy to store and transport compared to the assembled multi-copter. Second, if a part of this multi-copter breaks, its modularity enables the operator to quickly and easily replace the module(s) or subassembly(ies) including the broken part with a properly functioning replacement module(s) or subassembly(ies) rather than waste time repairing the broken component(s).

The multi-copter 10 may include various electronic components, such as but not limited to: (1) a controller; (2) a communications interface; (3) an inertial measurement unit (IMU); (4) a barometer (or other suitable pressure sensor); (5) a GPS receiver; and (6) eight electronic speed controllers (ESCs). The multi-copter 10 may also include various motors, such as a cam servo motor, a lock servo motor, and a plurality of rotor motors to control each of the rotors.

The controller is electrically and communicatively connected to the communications interface, the IMU, the barometer, the GPS receiver, the ESCs, the cam servo motor, and the lock servo motor. The controller includes a processor and a memory. The processor is configured to execute program code or instructions stored in the memory to control operation of the multi-copter 10, as described herein. The processor may be one or more of: (1) a general-purpose processor; (2) a content-addressable memory; (3) a digital-signal processor; (4) an application-specific integrated circuit; (5) a field-programmable gate array; (6) any suitable programmable logic device, discrete gate, or transistor logic; (7) discrete hardware components; and (8) any other suitable processing device.

The memory is configured to store, maintain, and provide data as needed to support the functionality of the multi-copter 10. For instance, in various embodiments, the memory stores program code or instructions executable by the processor to control the multi-copter 10. The memory may be any suitable data storage device, such as one or more of: (1) volatile memory (e.g., RAM, which can include non-volatile RAM, magnetic RAM, ferroelectric RAM, and any other suitable forms); (2) non-volatile memory (e.g., disk memory, FLASH memory, EPROMs, EEPROMs, memristor-based non-volatile solid-state memory, etc.); (3) unalterable memory (e.g., EPROMs); and (4) read-only memory.

The communications interface is a suitable wireless communication interface, such as a transceiver like an MM2 900

MHz Embedded Radio by Freewave Technologies, configured to establish and facilitate communication between the controller and: (1) a computing device (such as a laptop computer, a tablet computer, or a mobile phone, not shown); and (2) an R/C controller (not shown) that the operator of the multi-copter 10 controls. In operation, once the communications interface establishes communication with the computing device, the controller can send data (via the communications interface) associated with the operation of the multi-copter 10 (such as the operational status of the multi-copter 10, GPS coordinates of the multi-copter 10, rotor motor status, IMU or other sensor measurements, altitude, GPS reception health, magnetometer health, attitude, and the like) to the computing device. Once the communications interface establishes communication with the R/C controller, the controller can receive signals (via the communications interface) from the R/C controller. More specifically, upon receipt of these signals from the R/C controller, the communications interface converts these signals into a format readable by the controller and sends the converted signals to the controller for processing.

The IMU may include one or more accelerometers, gyroscopes, and/or magnetometers. The accelerometers, gyroscopes, and magnetometers continuously or periodically obtain sensor readings and continuously or periodically transmit corresponding signals to the controller, which uses these sensor readings in a variety of different ways described herein. This is merely one example IMU, and the IMU may include any suitable sensors.

The barometer is configured to sense the atmospheric pressure and to transmit a signal representing the sensed atmospheric pressure to the controller. This information may be used to determine a height of the multi-copter 10.

The GPS receiver is communicatively connectable with (such as via a suitable wireless protocol) GPS satellites (not shown), as is known in the art. The GPS receiver is configured to receive signals from one or more of the GPS satellites, to determine the multi-copter's location using those signals, and to transmit signals representing the multi-copter's location to the controller.

The ESCs are electrically connected to and, along with the controller, control the operation of the rotor motors of the multi-copter 10.

The multi-copter 10 includes a hub module, to which the fixed-wing aircraft 20 is attached for launch, and to which a flexible capture member 5000 is attached to retrieve the fixed-wing aircraft from flight. The hub module includes a hub base and a saddle. The saddle is attached to the underside of the hub base. The hub module also includes a flexible capture member storage device (not shown) attached to the hub base and/or the saddle. The flexible capture member storage device is configured to store and release the flexible capture member to enable retrieval of the multi-copter 10 via the downhaul winch 3000.

2. Storage Assembly

Figure 2A:
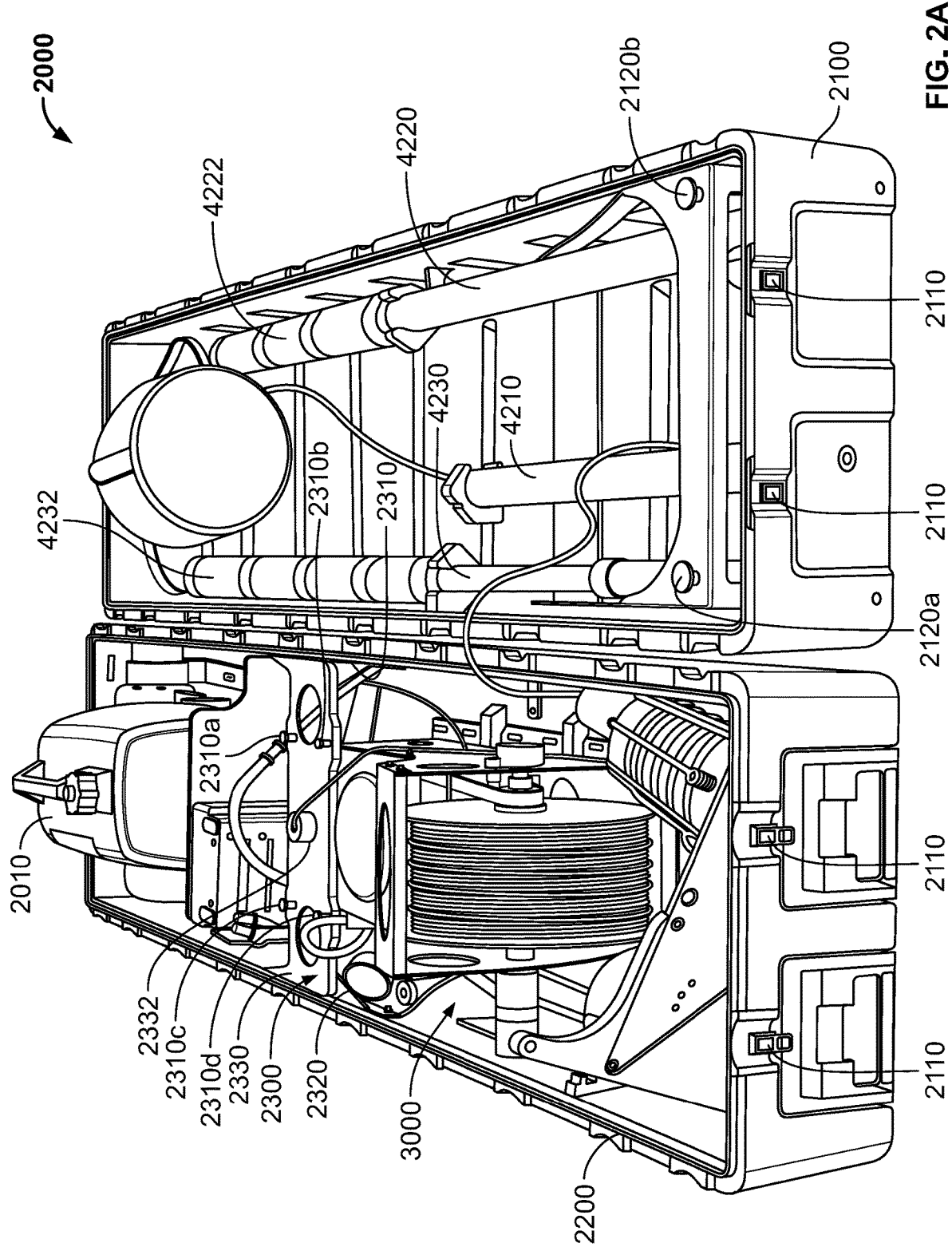
FIG. 2A is a top perspective view of a first example storage assembly (including a gas generator) of one example embodiment of the present disclosure.
Figure 2B:
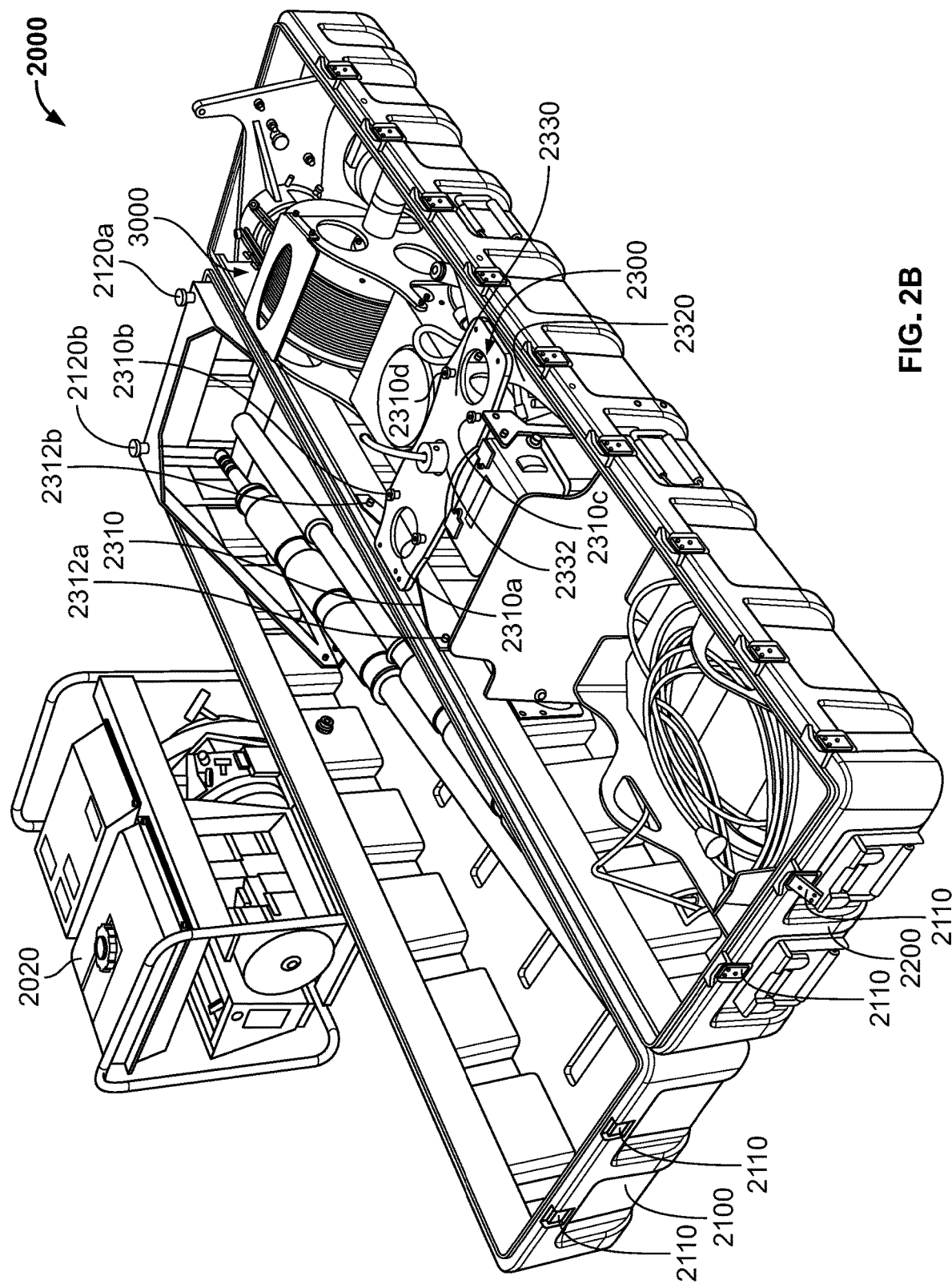
FIG. 2B is top perspective view of a second example storage assembly (including a diesel generator) of another example embodiment of the present disclosure.

FIG. 2A shows a first example storage assembly. FIG. 2B shows a second example storage assembly. The first example storage assembly includes a gas generator 2010. The second example storage assembly includes a diesel generator 2020. Additional items may be stored in the same container as the articulatable monopole assembly, such as a battery charger for the multi-copter, the retrieval rope (which functions as a flexible capture member) and bungee, and an engine cooling module for controlling fixed-wing aircraft engine temperature during preflight. The first example storage assembly and the second example storage assembly include many similar or identical features that are described together herein with respect to a single example storage assembly 2000. The storage assembly 2000 is usable to compactly store the downhaul winch 3000, the articulatable monopole assembly 4000, the flexible capture member 5000, and a generator 2010 or 2020 in a single container. The storage assembly 2000 also facilitates retrieval of the fixed-wing aircraft 20 from free, wing-borne flight by acting as a base on which the downhaul winch 3000 and the articulatable monopole assembly 4000 can be mounted and supported during the retrieval process.

The multi-copter 10 may be stored (disassembled) in a separate storage assembly (not shown).

To facilitate storage of the generator 2010 or 2020, the downhaul winch 3000, and the articulatable monopole assembly 4000 in a single container, the storage assembly 2000 includes: (1) a container top 2100 and container bottom 2200, (2) a monopole mounting assembly 2300, and (3) space for the various components including the generator 2010 or 2020, the downhaul winch 3000, the components of articulatable monopole assembly 4000, etc.

The container top 2100 and container bottom 2200 are sized to fit the various components. The container top 2100 and/or container bottom 2200 may include one or more storage brackets (not labeled) that are used to affix the various components to the storage assembly 2000, in order to avoid shifting or movement of the components during transit. The container top 2100 and container bottom 2200 are configured to connect to each other via a plurality of latches 2110, and are completely separable from each other. The container top 2100 and container bottom 2200 are formable into a "T" shape as shown in FIGS. 4A, 4B, 4C, and 4E, particularly during the process of retrieval of the fixed-wing aircraft 20.

Alternatively, as further described below, the articulatable monopole assembly may be mounted toward one end of the storage container, and one or more such as a pair of outriggers may pivot outwardly to form a broad triangular footprint. When two outriggers are employed, two points of the triangle are defined by the respective outrigger feet, and the third point is at the far end of the container. The lid may be used to secure the outriggers, keeping the triangular footprint as broad as possible. The outriggers may be telescopic subassemblies, to further-broaden the footprint. By broadening the footprint, the support structure for the articulatable monopole assembly may be kept light, which provides a distinct advantage when the equipment must be moved by humans.

The storage assembly 2000 also includes the monopole mounting assembly 2300. The monopole mounting assembly includes: (1) a first container mounting bracket 2310, (2) a second container mounting bracket 2320, and (3) a lateral monopole support plate 2330.

The first container mounting bracket 2310 is affixed to an inner wall of the container bottom 2200 via two fasteners 2312a and 2312b. The first container mounting bracket 2310 is affixed to the container bottom 2200 at a midpoint or central point of the container bottom 2200, as illustrated in FIGS. 2A and 2B. The fasteners may be screws, bolts, or any other type of fastener. The first container mounting bracket 2310 is also affixed to the lateral monopole support plate 2330. The first container mounting bracket 2310 may be affixed to the lateral monopole support plate 2330 by welding, one or more fasteners, or by some other mechanism.

The second container mounting bracket 2320 is similar or identical to the first container mounting bracket 2310, but with a flipped or mirrored orientation.

The lateral monopole support plate 2330 extends laterally across the open side of the container bottom 2200. The top surface of the lateral monopole support plate 2330 is even with the top edge of the container bottom 2200. In some examples, the lateral monopole support plate 2330 may be set into the container bottom 2200, such that a top surface of the lateral monopole support plate 2330 is below the top edge of the container bottom 2200. The lateral monopole support plate extends laterally across a middle of the container bottom 2200, as shown best in FIGS. 2A and 2B.

The lateral monopole support plate 2330 includes four monopole base mounting bolts 2310a-d. The monopole base mounting bolts 2310a-d extend upwardly from a top surface of the lateral monopole support plate 2320. The monopole base mounting bolts 2310a-d are configured to extend through corresponding apertures of the monopole base 4100 of the articulatable monopole assembly 4000. The lateral monopole support plate 2330 includes a top surface that defines a central aperture 2332. The central aperture 2332 is circular, and is configured to receive the lower sealing and mounting component 3900 of the downhaul winch 3000. The flexible capture member 5000 of the downhaul winch 3000 is configured to extend from the downhaul winch 3000, through the central aperture 2332, and through a channel defined by the articulatable monopole assembly 4000. The central aperture 2332 is also positioned to align with a central axis of the articulatable monopole assembly 4000.

Figure 4A:
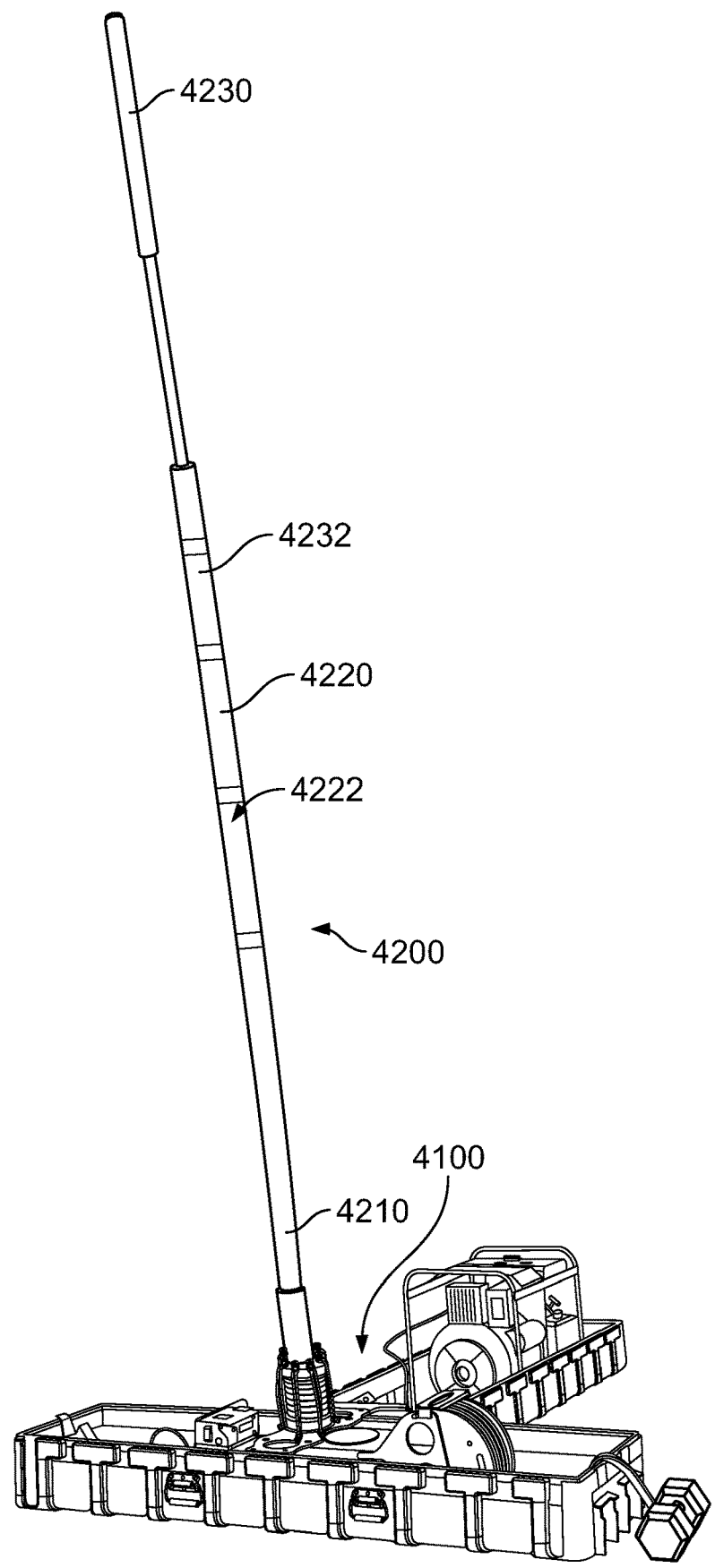
FIG. 4A is a front perspective view of an example aircraft retrieval device of one example embodiment of the present disclosure, and shown supported by the one of the storage assemblies of the present disclosure.
Figure 4B:
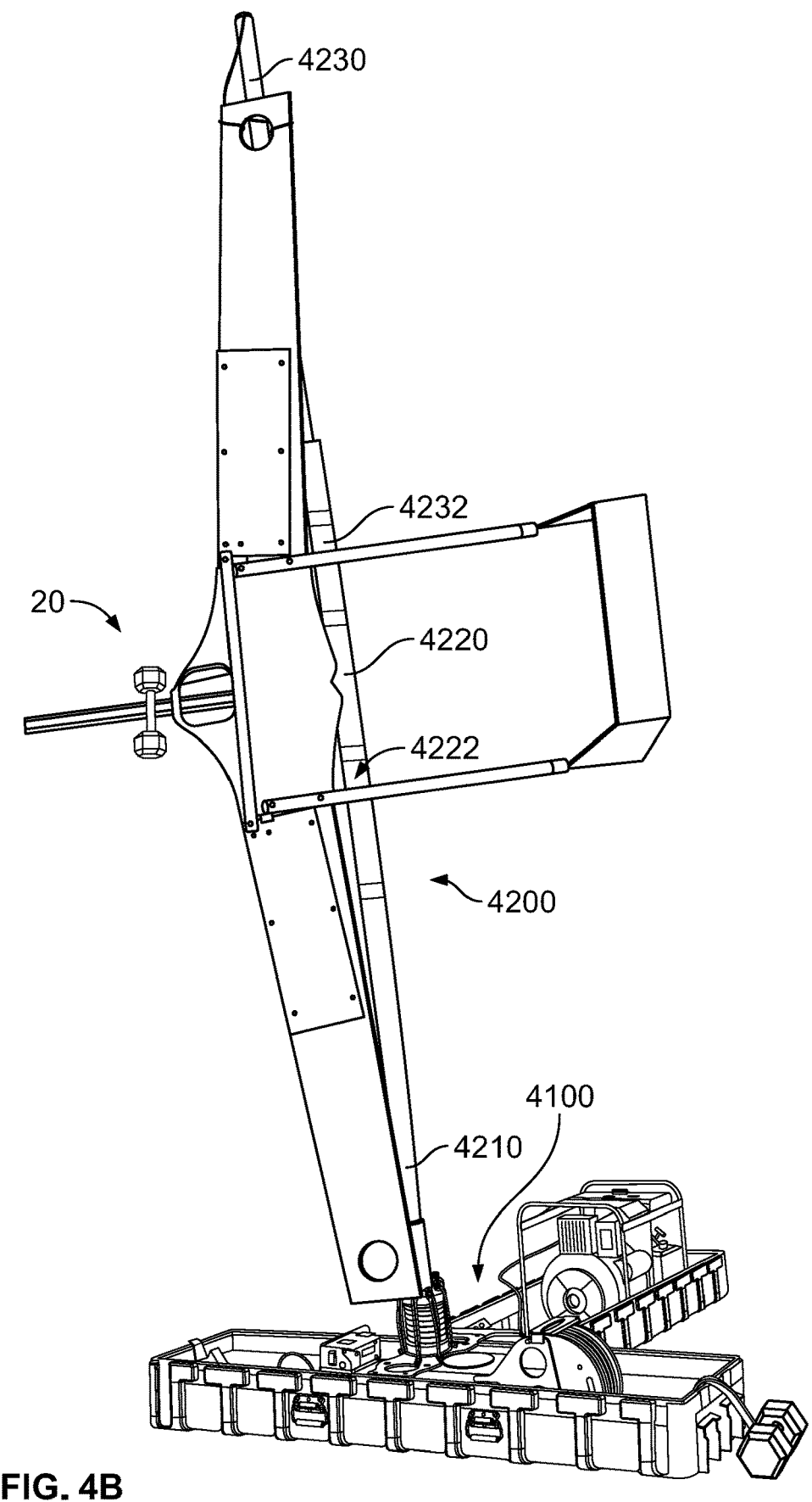
FIG. 4B is a front perspective view of the aircraft retrieval device of FIG. 4, shown after an aircraft has been retrieved by the aircraft retrieval device, and shown supported by one of the storage assemblies of the present disclosure.
Figure 4C:
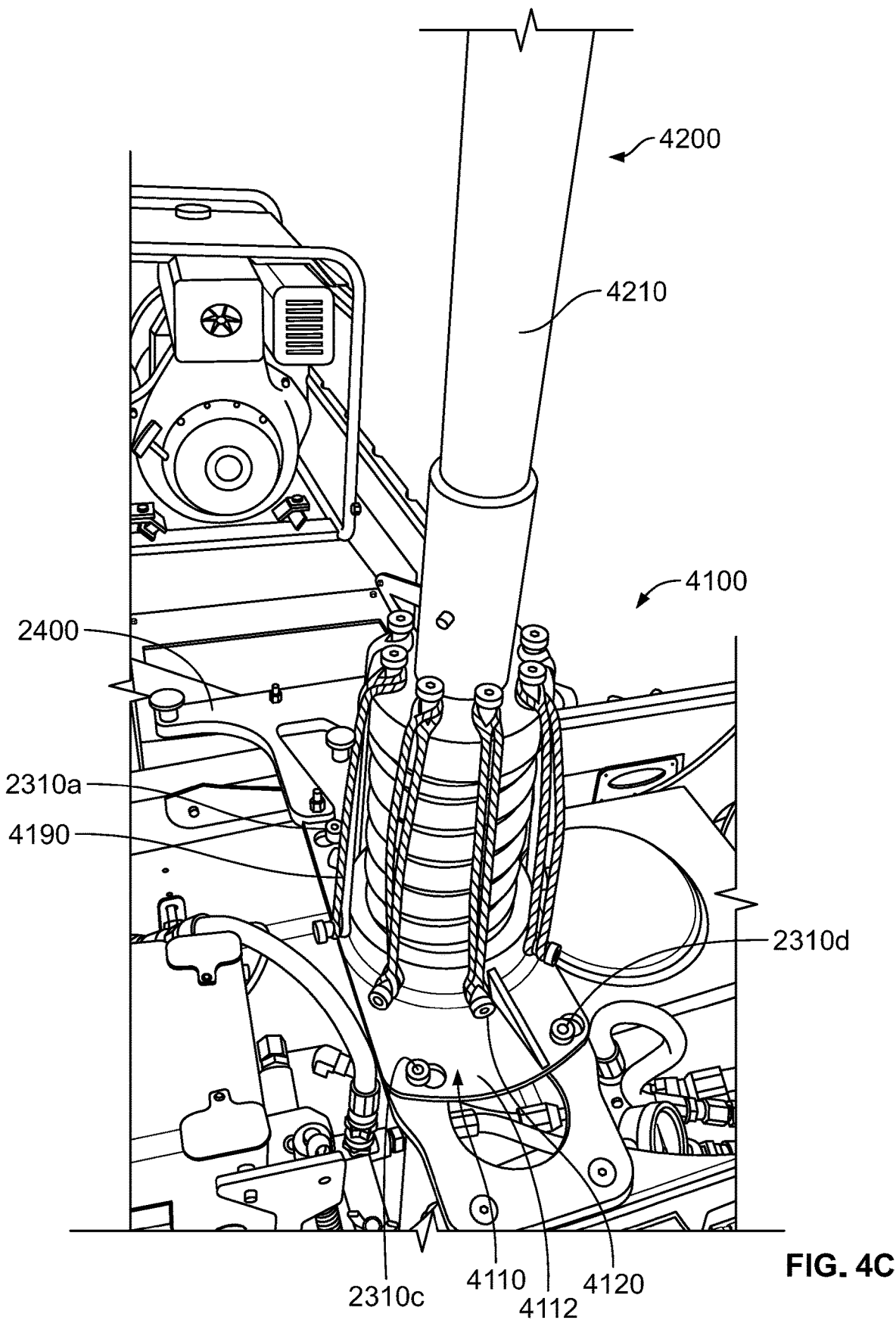
FIG. 4C is an enlarged perspective view of an example articulating joint of an articulatable monopole assembly of the aircraft retrieval device of FIG. 4A, and shown supported by one of the storage assemblies of the present disclosure shown in fragmentary.
Figure 4D:
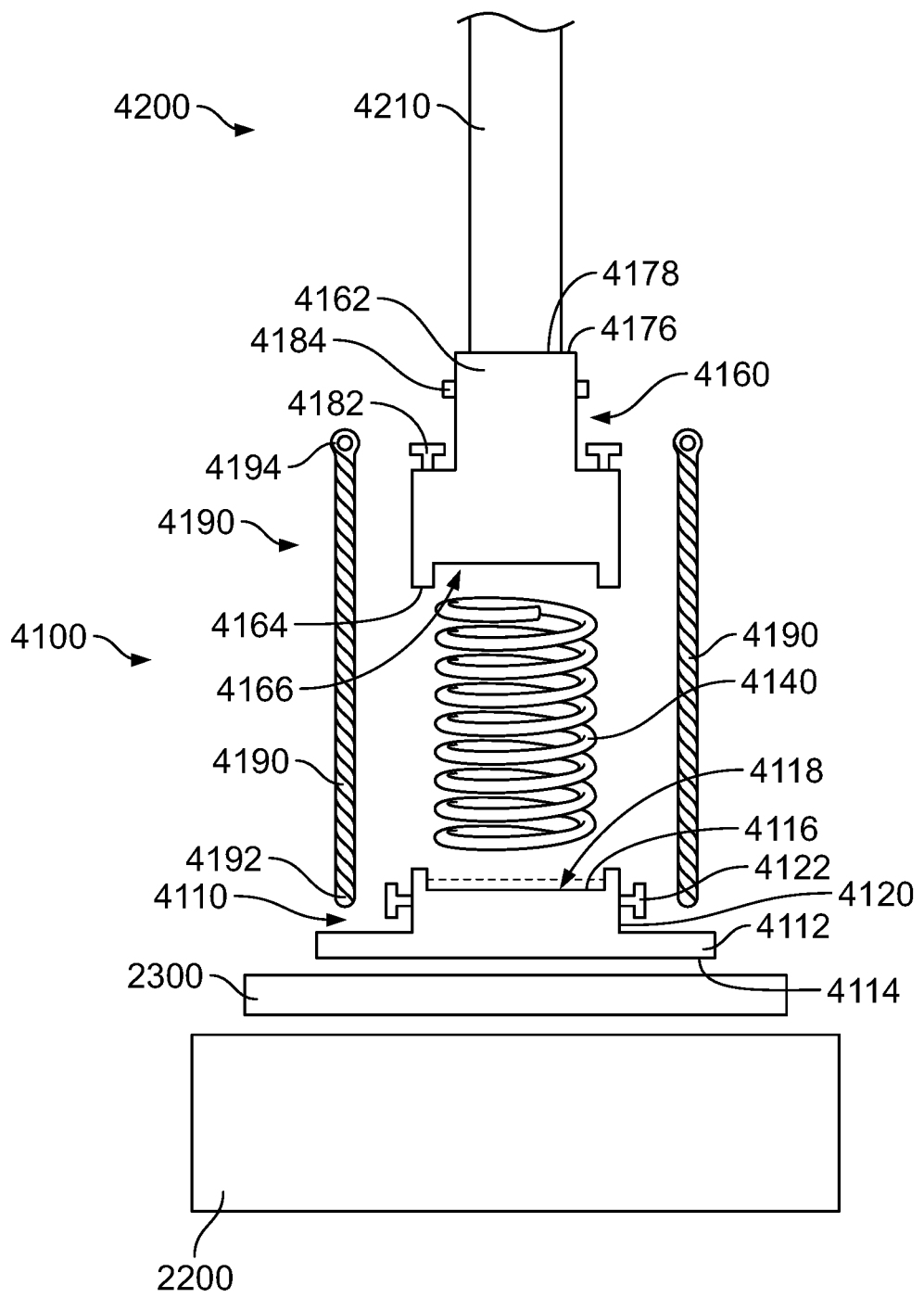
FIG. 4D is an exploded view of the articulating joint of the articulatable monopole assembly of FIG. 4C, and showing one of the storage assemblies of the present disclosure.

The storage assembly 2000 also includes a container connection bracket 2400. The container connection bracket 2400 is best illustrated in FIG. 4C. The container connection bracket extends from the lateral monopole support bracket 2330 to a first end of the container top 2100. The container top 2100 includes top side connection members 2110a and 2110b, configured to attach to the container connection bracket 2400. The container connection bracket 2400 enables the container top 2100 and container bottom 2200 to be locked into a "T" shape for retrieval of the fixed-wing aircraft. This orientation provides increased stability when the articulatable monopole assembly 4000 is erected, and when forces are imparted onto the articulatable monopole assembly 4000 and storage assembly 2000 during capture of the fixed-wing aircraft. The likelihood of the storage assembly 2000 and articulatable monopole assembly 4000 tipping over during capture of the fixed-wing aircraft is reduced.

3. Downhaul Winch

The embodiment shown in the Figures includes a tensioning device in the form of the downhaul winch 3000. As such, an example downhaul winch 3000 is described in further detail below. It should be appreciated, however, that the downhaul winch 3000 is only one example device that can be used to provide tension to the flexible capture member used in retrieval of the fixed-wing aircraft. Other tensioning devices can include, for example, a bungee, a piston, or a moving weight. Each of these tensioning devices may be connected to the low end of the flexible capture member to provide a resistive force on the flexible capture member, thereby maintaining tension. Although the tensioning device can take various forms, the embodiment disclosed herein may be described only in the context of downhaul winch 3000.

The downhaul winch 3000 and components thereof is shown in FIGS. 3A-3E. The downhaul winch 3000 is usable along with the multi-copter 10, the flexible capture member 5000 (described below), and the articulatable monopole assembly 4000 (described below) to retrieve the fixed-wing aircraft 20 from free, wing-borne flight. Generally, the components of the downhaul winch 3000 operate together to impose a regulated force on the flexible capture member 5000 during the fixed-wing aircraft retrieval process. This means that the downhaul winch 3000 is configured to regulate—i.e., maintain substantially constant—the tension in the flexible capture member 5000 while the multi-copter 10 is station-keeping relative to the downhaul winch 3000 in preparation for retrieval of the fixed-wing aircraft 20. This simplifies multi-copter operation during the fixed-wing aircraft retrieval process by eliminating the need for the multi-copter operator to control the altitude of the multi-copter 10 to maintain a desired tension in the flexible capture member 5000.

The downhaul winch 3000 includes a winch base 3100, a first mounting bracket 3200, a second mounting bracket 3300, a separator bracket 3400, and a flexible capture member payout and retract system (not labeled). The flexible capture member payout and retract system includes a drum assembly 3500, a level wind system 3600, a transition assembly 3700, and a hydraulic system (not labeled).

3.1 Winch Base and Brackets

Figure 3A:
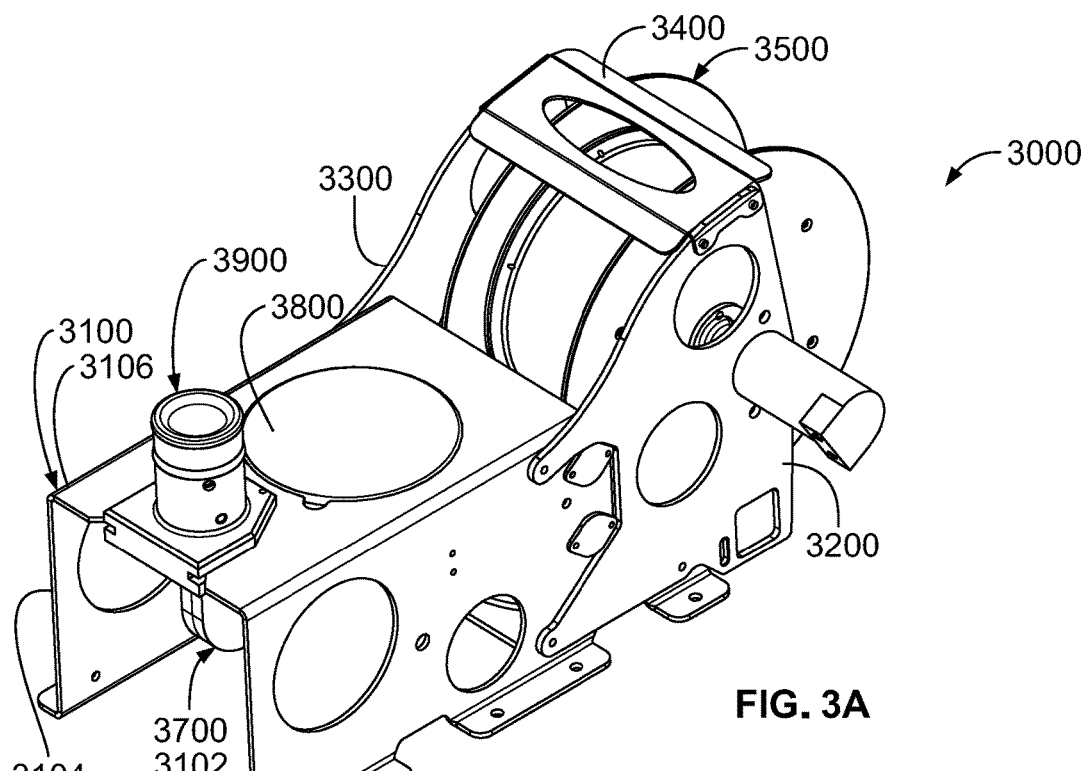
FIGS. 3A and 3B are top perspective views of an example downhaul winch of one example embodiment of the present disclosure.
Figure 3B:
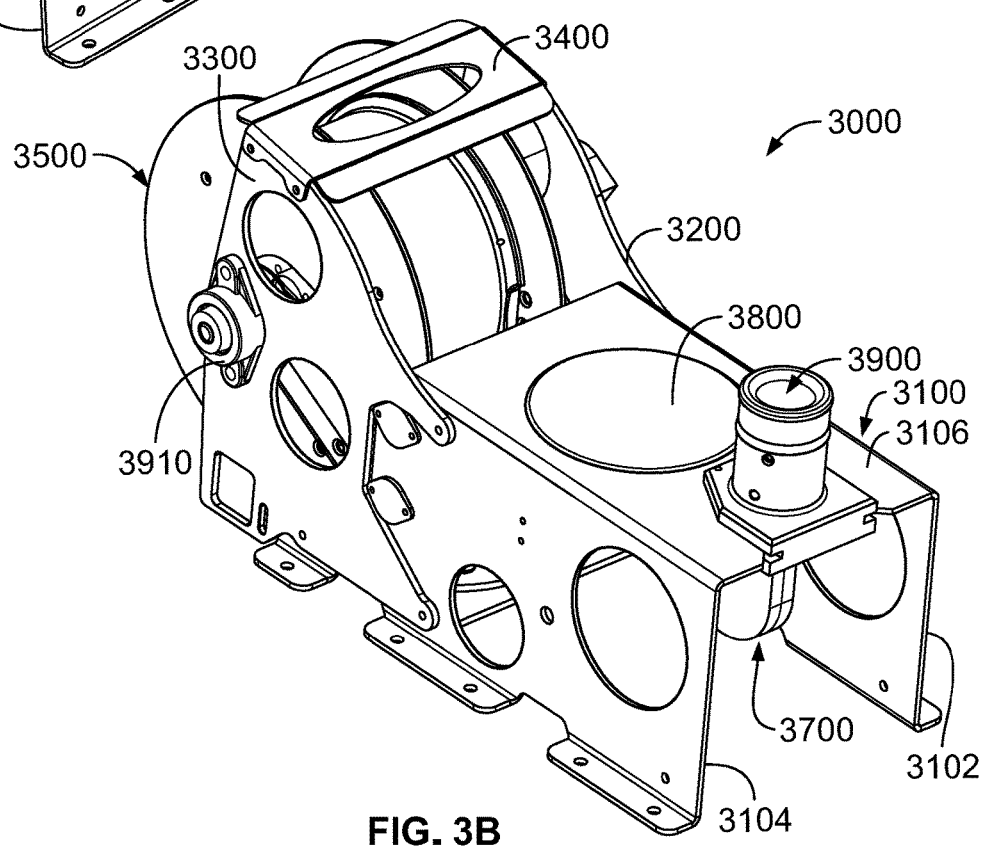
Figure 3C:
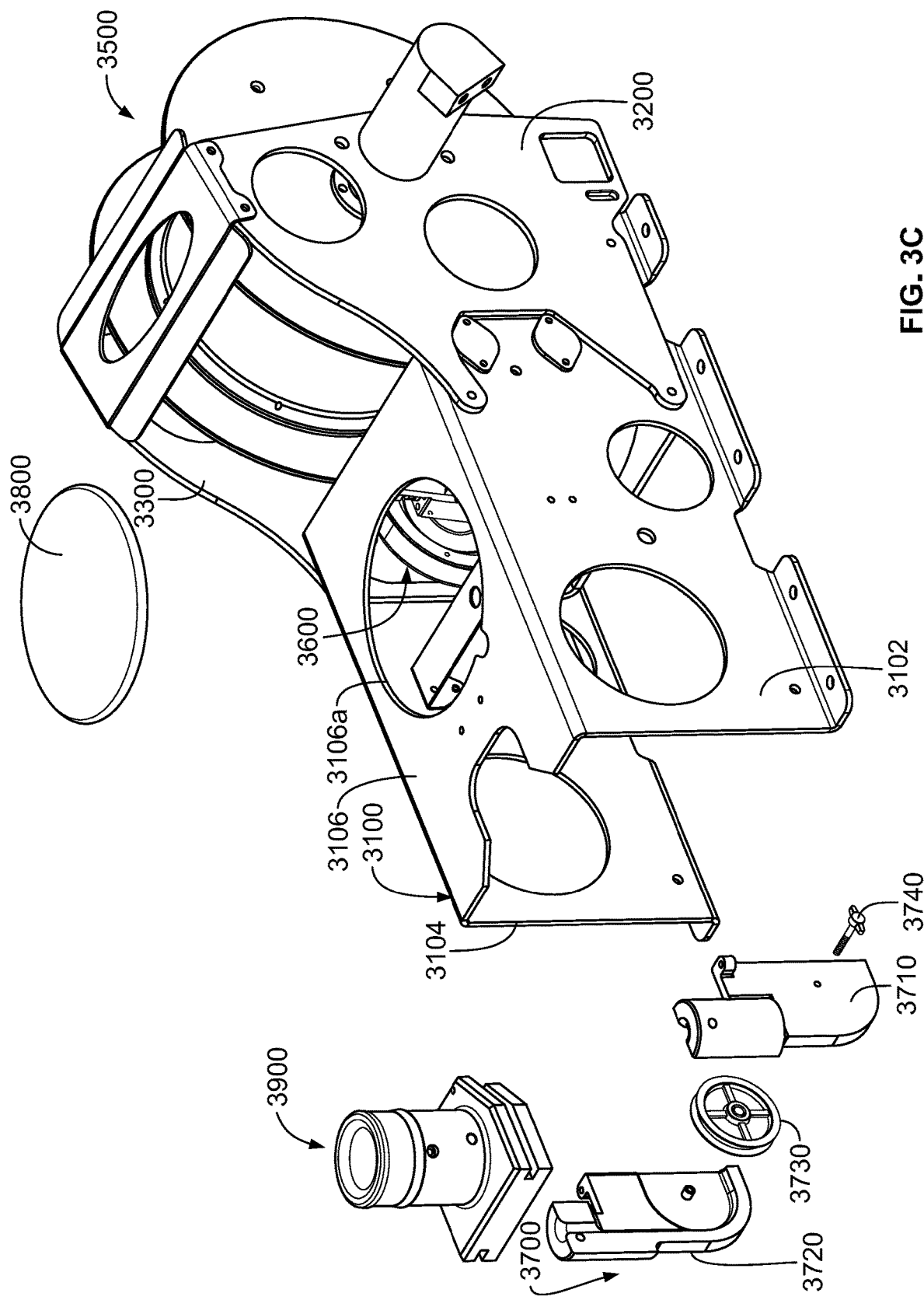
FIG. 3C is a partially exploded top perspective view of the downhaul winch of FIGS. 3A and 3B.

The winch base 3100 serves as a mount for certain other elements of the downhaul winch 3000. As best shown in FIGS. 3A-3E, the winch base 3100 includes two spaced-apart, generally parallel sides 3102 and 3104 and a top 3106 transverse (such as generally perpendicular) to, extending between, and connecting the sides 3102 and 3104. As best shown in FIG. 3C, the top 3106 includes a surface 3106a that defines a GPS antenna mounting opening. The GPS antenna 3800 is attached to a mounting bracket (not labeled) that extends between the sides 3102 and 3104 such that the GPS antenna 3800 extends through the GPS antenna mounting opening of the top 3106. As described below, a lower sealing and mounting component 3900 is attachable to the top 3106 of the winch base 3100 via the lower sealing and mounting component mounting opening to attach the articulatable monopole assembly 4000 to the down winch base 3100.

Figure 3D:
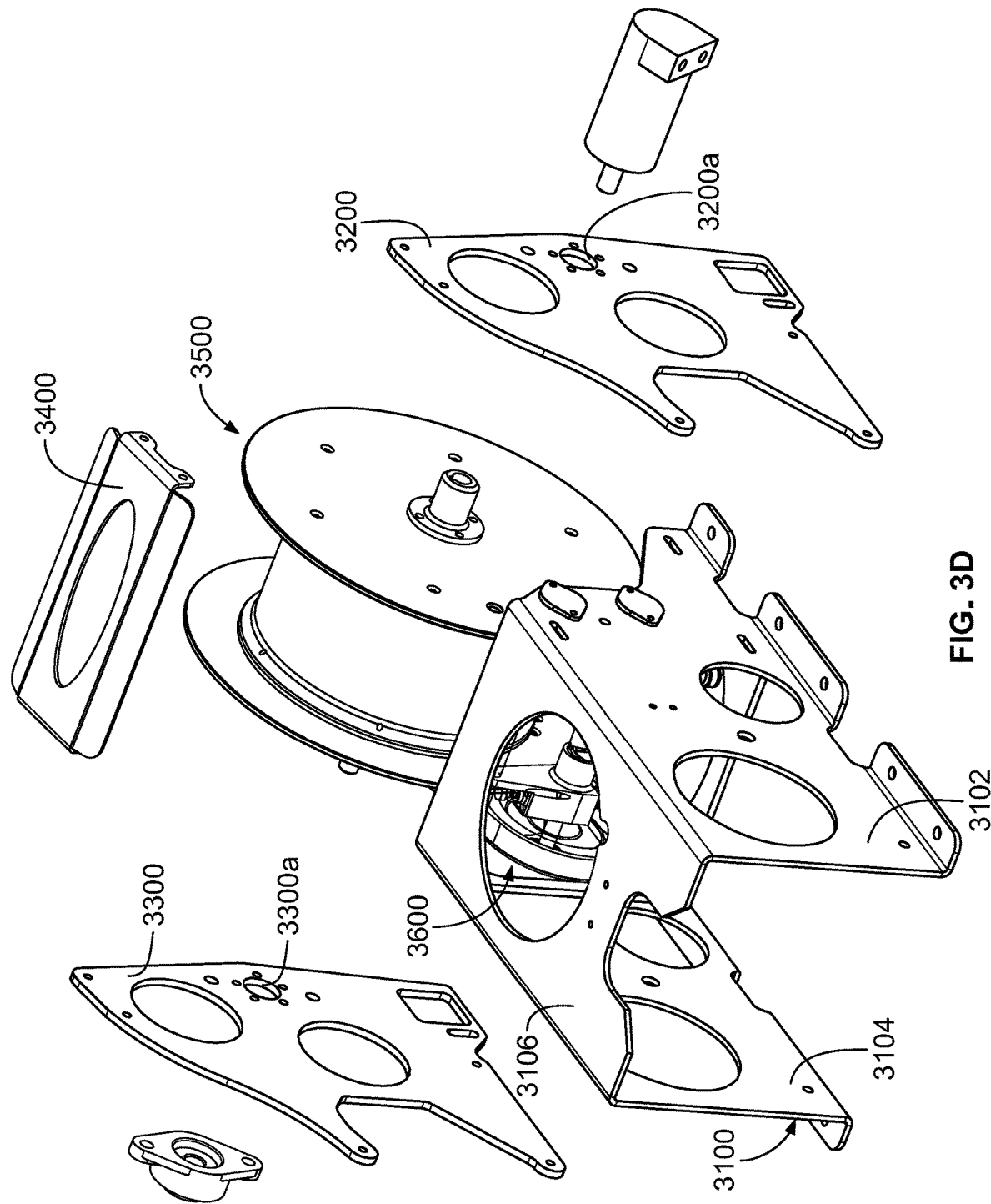

The first and second mounting brackets 3200 and 3300 serve as mounts for the drum assembly 3500 and part of the hydraulic system (not labeled). As best shown in FIGS. 3D and 3E, the first and second mounting brackets 3200 and 3300 are generally planar and include respective cylindrical surfaces 3200a and 3300a that respectively define first and second mounting openings through the first and second mounting brackets 3200 and 3300. The first mounting bracket 3200 is attached to the first side 3102 of the winch base 3100 via suitable fasteners (not shown), and the second mounting bracket 3300 is attached to the second side 3104 of the winch base 3100 via suitable fasteners (not shown). The separator bracket 3400 is attached to and extends between the first and second mounting brackets 3200 and 3300 via suitable fasteners (not shown) to maintain the spacing between these components.

3.2 Drum Assembly

The flexible capture member 5000 may be wound onto and off of the drum assembly 3500. The drum assembly 3500 may include various components configured to enable the drum assembly 3500 to wind and unwind the flexible capture member, and to maintain a set tension level on the flexible capture member 5000. For example, the drum assembly 3500 may include a drum having a cylindrical exterior surface and a cylindrical interior surface; a first drum flange having a circular exterior surface, a circular interior surface, a cylindrical perimeter surface, and a cylindrical mounting surface that defines a mounting opening through the first flange 3512; a second drum flange having a circular exterior surface, a circular interior surface, a cylindrical perimeter surface, and a cylindrical mounting surface that defines a mounting opening through the second flange; a drum shaft; a coupler including a tubular coupler shaft defining a shaft-receiving bore therethrough and a coupler flange extending radially outwardly from the coupler shaft; a first annular flange; a second annular flange; and a third annular flange.

3.3 Level Wind System

The level wind system 3600 ensures that the flexible capture member 5000 is wound onto (and off of) the drum assembly 3500 in a generally uniform manner. The level wind system 3600 includes a level wind shaft, a first traveler, a second traveler, a guide shaft, a first pulley, a second pulley, and a belt (all not labeled).

In operation, as the drum shaft of the drum assembly 3500 rotates, the second pulley rotates therewith. Rotation of the second pulley causes the first pulley to rotate due to their connection via the belt. Rotation of the first pulley causes the level wind shaft to rotate. Rotation of the level wind shaft causes the first and second travelers to slide relative to the level wind shaft due to their guide elements being received in the grooves defined in the level wind shaft. This sliding of the first and second travelers (which is keyed to rotation of the drum shaft) guides placement of the flexible capture member 5000 as it is wound onto (or off of) the drum.

3.4 Transition Assembly

The transition assembly 3700 is configured to route the flexible capture member 5000 from the articulatable monopole assembly 4000 to the level wind system 3600. As best shown in FIG. 3C, the transition assembly 3700 includes a first transition assembly housing portion 3710, a second transition assembly housing portion 3720, a transition pulley 3730, and a fastener 3740. The first and second transition assembly housing portions 3710 and 3720 are attachable to one another via the fastener 3740, and together define a transition pulley cavity and a flexible capture member receiving bore in fluid communication with the transition pulley cavity. The transition pulley 3730 is rotatably mounted on a spindle (not labeled) within the transition pulley cavity such that the transition pulley 3730 can rotate relative to the first and second transition assembly housing portions 3710 and 3720. The transition assembly 3700 is attachable to the lower sealing and mounting component 3900, which in turn is slidably receivable on the winch base 3100.

4. Monopole Assembly

As mentioned above, the force of contact by the fixed-wing aircraft 20 on the flexible capture member 5000 can cause issues for the multi-copter 10 in maintaining flight. This can result in damage to the multi-copter 10 or fixed-wing aircraft 20. In certain situations, a monopole assembly such as an articulatable monopole assembly 4000 of the present disclosure is employed to partially absorb the force of impact when the fixed-wing aircraft 20 contacts the flexible capture member 5000. The use of the monopole assembly such the articulatable monopole assembly 4000 provides various benefits, such as those described above, as well as by enabling a smaller ground footprint to be used for capturing the fixed-wing aircraft. As noted above, the monopole assembly such as the articulatable monopole assembly 4000 enables an aircraft to contact the flexible capture member 5000 closer to the ground than would otherwise be possible, while minimizing the risk of the monopole assembly such as the articulatable monopole assembly 4000 tipping over. It should be appreciated that when capturing a fixed-wing aircraft using a flexible capture member, such as described herein with respect to FIGS. 5A-D, it may be beneficial for the fixed-wing aircraft to contact the flexible capture member as low as possible toward the ground. This is for three reasons and particularly, navigation, energy absorption, and reduced flight time.

First, when the flexible capture member is extended into the air to capture the fixed-wing aircraft, wind and other factors can cause the flexible capture member to sway or move. The flexible capture member moves a smaller distance closer to the ground, meaning that the fixed-wing aircraft is more likely to make contact with the flexible capture member at the prescribed location and position on the aircraft wing if it makes contact close to the ground.

Second, when the fixed-wing aircraft contacts the flexible capture member, the aircraft is travelling at a relatively high speed. The energy from the impact of the fixed-wing aircraft on the flexible capture member must be absorbed in order to bring the aircraft to a stop. In the embodiment of FIGS. 5A-D, the flexible capture member is held aloft by the multi-copter 10 above the contact point, and by the downhaul winch 3000 below the contact point. The downhaul winch 3000 is more able to absorb the impact energy without any ill effects than the multi-copter 10. As such, it is beneficial for the contact point to be closer to the downhaul winch 3000 than to the multi-copter 10.

Third, the multi-copter 10 is required to maintain a given altitude during the process of retrieving the fixed-wing aircraft. After the fixed-wing aircraft contacts the flexible capture member, the multi-copter 10 carries the full weight of both the flexible capture member and the fixed-wing aircraft. The fixed-wing aircraft must then be lowered down toward the ground. If the fixed-wing aircraft contacts the flexible capture member close to the ground, less time will be required to lower the aircraft toward the ground than if the fixed-wing aircraft makes contact higher up toward the multi-copter 10. A low contact point results in less time flying the multi-copter 10 at peak load (i.e., while fully supporting the fixed-wing aircraft), meaning that less energy is used.

The drawback to a low contact point, however, is that when the fixed-wing aircraft 20 makes contact low toward the ground it imparts a high overturning moment on the structure on the ground (i.e., the storage assembly 2000 and monopole assembly such as the articulatable monopole assembly 4000). To reduce the effect of this high overturning moment, in various embodiments, the monopole assembly such as the articulatable monopole assembly 4000 of this disclosure is configured absorb certain forces such as by articulating when the overturn moment exceeds a threshold. This enables the base structure (i.e., storage assembly 2000) to be less heavy while still providing a sufficient structure to support the monopole assembly such as the articulatable monopole assembly 4000 and fixed-wing aircraft 20 after it has been captured and lowered.

FIGS. 4A-4H illustrate one example embodiment of the articulatable monopole assembly 4000 and its components. This illustrated example articulatable monopole assembly 4000 includes: (1) an articulating joint 4100, and (2) an upstanding pole structure 4200. In this disclosure, the term "articulatable monopole assembly" may be used to describe various embodiments of the monopole assembly, including embodiments in which the articulating joint is articulatable, the upstanding pole structure is articulatable, or both.

The illustrated example articulating joint 4100 includes: (1) a joint base 4110, (2) a spring 4140, (3) an upper coupling assembly 4160, and (4) a plurality of ligaments 4190.

The illustrated example joint base 4110 includes a lower joint plate 4112 and a plurality of lower ligament connectors 4122.

The illustrated example lower joint plate 4112 includes a substantially flat lower surface 4114. The lower surface 4114 faces and is in contact with the top surface of the lateral monopole support plate 2300. The lower joint plate 4112 and the lateral monopole support plate 2300 are coupled together via the plurality of mounting bolts 2310a-d. The lower joint plate 4112 includes an upper surface 4116. The lower joint plate 4112 defines a lower spring receiving recess 4118. The lower spring receiving recess 4118 is cylindrical in shape, and is configured to receive a first end of the spring 4140. The lower joint plate 4112 also includes a cylindrical side surface 4120. The plurality of lower ligament connectors 4122 extend radially from the cylindrical side surface 4120 perpendicular to a longitudinal axis of the articulatable monopole assembly 4000. The plurality of lower ligament connectors 4122 are spaced evenly around a circumference of the lower joint plate 4112. As discussed below, respective first ends 4192 of the plurality of ligaments 4190 are configured to be attachable to the plurality of lower ligament connectors 4122. The joint base 4110 defines a central opening (not shown) through which the flexible capture member 5000 extends. The joint base is also positioned coaxially with the mounting component 3900 of the downhaul winch assembly 3000, and the lateral monopole support plate 2330 of the monopole mounting assembly 2300. This enables the flexible capture member to extend from the downhaul winch assembly 3000 though the joint base 4110 of the articulating joint 4100.

The illustrated example spring 4140 is coupled on a first end to the lower spring receiving recess 4118 of the lower joint plate 4112. The spring is coupled on a second end to the upper spring receiving recess 4166 of the upper joint plate 4162. The spring 4140 includes appropriate characteristics (stiffness, spring constant, etc.) such that the upstanding pole structure 4200 of the articulatable monopole assembly 4000 remains substantially upright when the fixed-wing aircraft 20 is supported by the upstanding pole structure 4200 via the flexible capture member 5000 (e.g., FIG. 4A). The spring 4140 also has appropriate characteristics such that it supports the upstanding pole structure 4200 and the fixed-wing aircraft 20 when it is preloaded or compressed via the plurality of ligaments 4190. The spring 4140 is positioned coaxially with the mounting component 3900 of the downhaul winch assembly 3000, the lateral monopole support plate 2330 of the monopole mounting assembly 2300, and the lower spring receiving recess 4118 of the lower joint plate 4112. This enables the flexible capture member 5000 to extend through the spring 4140.

The illustrated example upper coupling assembly 4160 includes an upper joint plate 4162, a plurality of upper ligament connectors 4182, and side pins 4184.

The illustrated example upper joint plate 4162 includes a lower surface 4164. The upper joint plate 4162 defines an upper spring receiving recess 4166. The upper spring receiving recess 4166 is configured to receive a second end of the spring 4140. The upper joint plate 4162 includes a top surface 4170. The plurality of upper ligament connectors 4182 extend from the top surface 4170. The plurality of upper ligament connectors 4182 are spaced evenly around the top surface 4170, and extend parallel to the longitudinal axis of the articulatable monopole assembly 4000. As discussed below, respective second ends 4194 of the plurality of ligaments 4190 are configured to be attachable to the plurality of upper ligament connectors 4182. The upper coupling assembly 4160 also includes side pins 4184. The side pins extend perpendicularly to the longitudinal axis of the articulatable monopole assembly 4000. The side pins couple the upper joint plate 4162 to the upstanding pole structure 4200. The upper joint plate 4162 has a top surface 4176 defining an aperture 4178 configured to receive the upstanding pole structure 4200. The upper coupling assembly 4160 defines a channel (not shown), to enable the flexible capture member 5000 to extend through it.

The illustrated example articulating joint 4100 includes a plurality of ligaments 4190. The plurality of ligaments 4190 are fibrous, braided, and are configured to stretch when a force is applied. The plurality of ligaments 4190 include respective first ends 4192 coupled to the lower ligament connectors 4122, and respective second ends 4194 coupled to the upper ligament connectors 4182. The plurality of ligaments 4190 are positioned evenly around the circumference of the articulating joint 4100. The plurality of ligaments are configured to preload the spring 4140, such that the spring is partially compressed in a default or initial stage prior to capture of the fixed-wing aircraft 20.

The amount of force provided by the plurality of ligaments 4190 to preload the spring 4140 is determined based on an amount of support needed to counteract the weight of the upstanding pole structure 4200 and the dangling fixed-wing aircraft 20 against windage (e.g., FIG. 4A), compared with a force required to allow the upstanding monopole structure 4200 to bend in response to an impact of the fixed-wing aircraft contacting the flexible capture member 5000. A low amount of preloaded force on the spring causes the spring to bend easier in response to an impact force from the fixed-wing aircraft contacting the flexible capture member 5000. At the same time, however, the low preloaded force can causes the articulatable monopole assembly to bend at rest when the fixed-wing aircraft is being supported by the articulatable monopole assembly 4000 (e.g., FIG. 4A). On the other hand, a high amount of preloaded force causes the spring 4140 to bend less readily, meaning that the articulatable monopole assembly 4000 is more rigid, increasing the likelihood that the articulatable monopole assembly 4000 and storage assembly 2000 tip over in response to the force from the fixed-wing aircraft 20 contacting the flexible capture member 5000. At the same time, however, the high preloaded force enables the articulatable monopole assembly 4000 to remain upright when the fixed-wing aircraft is lowered down and supported by the articulatable monopole assembly in wind, as in FIG. 4A.

The present disclosure contemplates that it may be desirable for an optimal range of preload force and spring rate to be used, such that the relatively rigid upstanding monopole structure 4200 bends over when the fixed-wing aircraft contacts the flexible capture member 5000, causing a sufficient moment to be exerted on the articulatable monopole assembly 4000, but is rigid enough to remain upright when the fixed-wing aircraft is lowered to the ground in windy conditions. The articulating joint 4100 is configured to absorb a portion of the energy from the contact by stretching the spring 4140 and plurality of ligaments 4190. By absorbing at least a portion of the force from the impact of the fixed-wing aircraft, the articulatable monopole assembly 4000 and storage assembly 2000 are less likely to tip over.

Further, by absorbing at least some of the force, the fixed wing aircraft is able to contact the flexible capture member lower to the ground (i.e., closer to the articulatable monopole assembly 4000) and with greater speed than would otherwise be possible, without causing the articulatable monopole assembly 4000 and storage assembly 2000 to tip over.

The illustrated example upstanding pole structure 4200 includes a lower mast segment 4210, a middle mast segment 4220, an upper mast segment 4230, and an upper guiding component 4240. These members are illustrated disassembled in FIG. 2A, and assembled in FIGS. 4A and 4D. As shown in FIG. 4B, in this illustrated example embodiment, the height of the upstanding pole structure above the articulating joint is larger than a wingspan of the fixed-wing aircraft.

The illustrated example lower mast segment 4210 is coupled at a first end to the upper joint plate 4162 of the articulating joint 4100, and to the middle mast segment 4220 at a second end. The lower mast segment 4210 is hollow, such that the flexible capture member 5000 can extend through the middle of the lower mast segment 4210. The middle mast segment 4220 is removably attached to the lower mast segment 4210 at a first end, and removably attached to the upper mast segment 4230 at a second end. The middle mast segment 4220 includes padding 4222 which is configured to protect the upstanding pole structure 4200 and various components of the fixed-wing aircraft 20 when they make contact as shown in FIG. 4A. The middle mast segment 4220 is also hollow. The upper mast segment 4230 is removably attached to the middle mast segment 4220 at a first end, and to the upper guiding component 4240 at a second end. The upper mast segment 4230 includes padding 4232 which is similar or identical to the padding 4222. The upper mast segment 4230 is hollow.

Figure 4E:
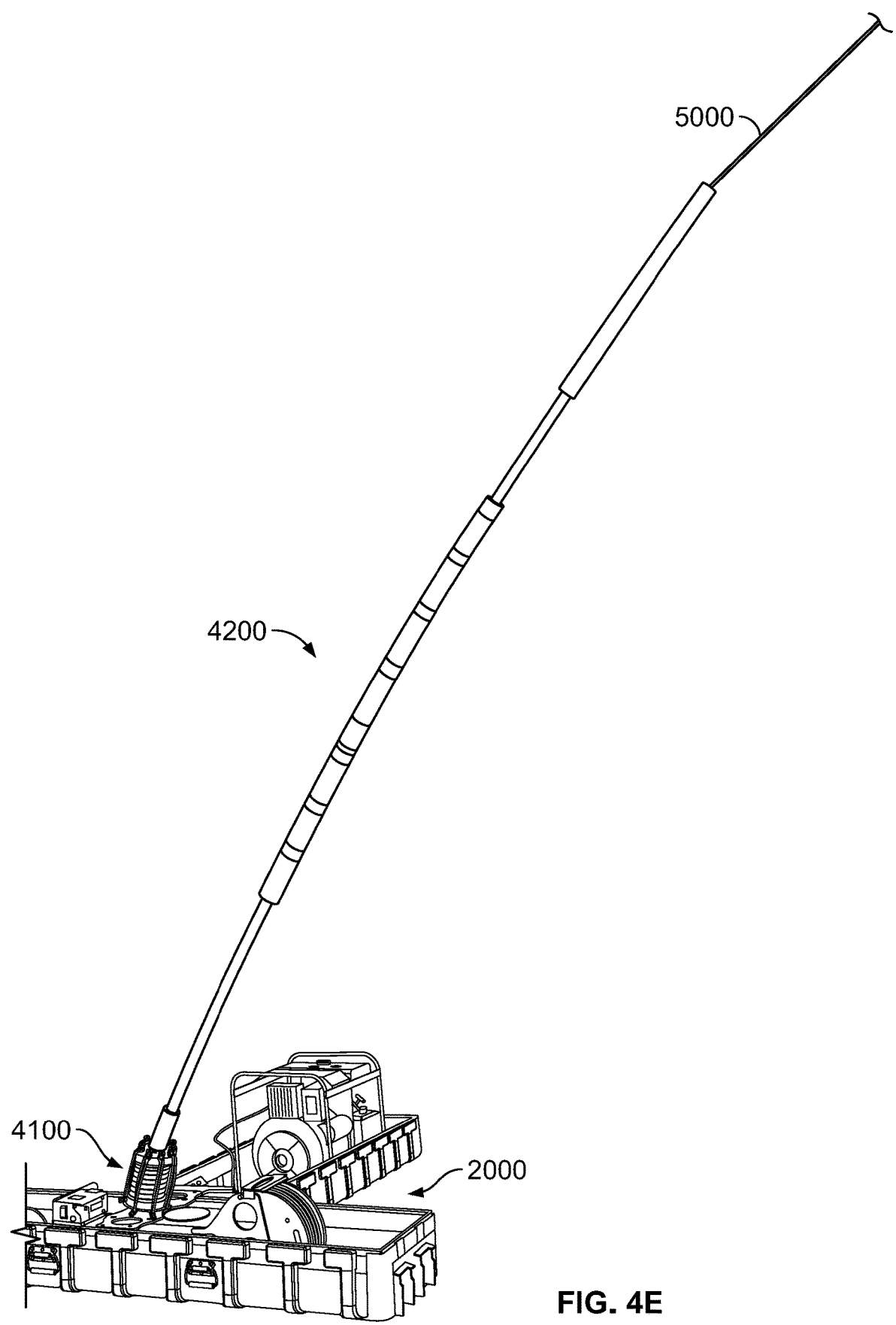
FIG. 4E is a side perspective view of the aircraft retrieval device of FIG. 4A experiencing a sideways force from the flexible capture member, and shown supported by one of the storage assemblies of the present disclosure.
Figure 4F:
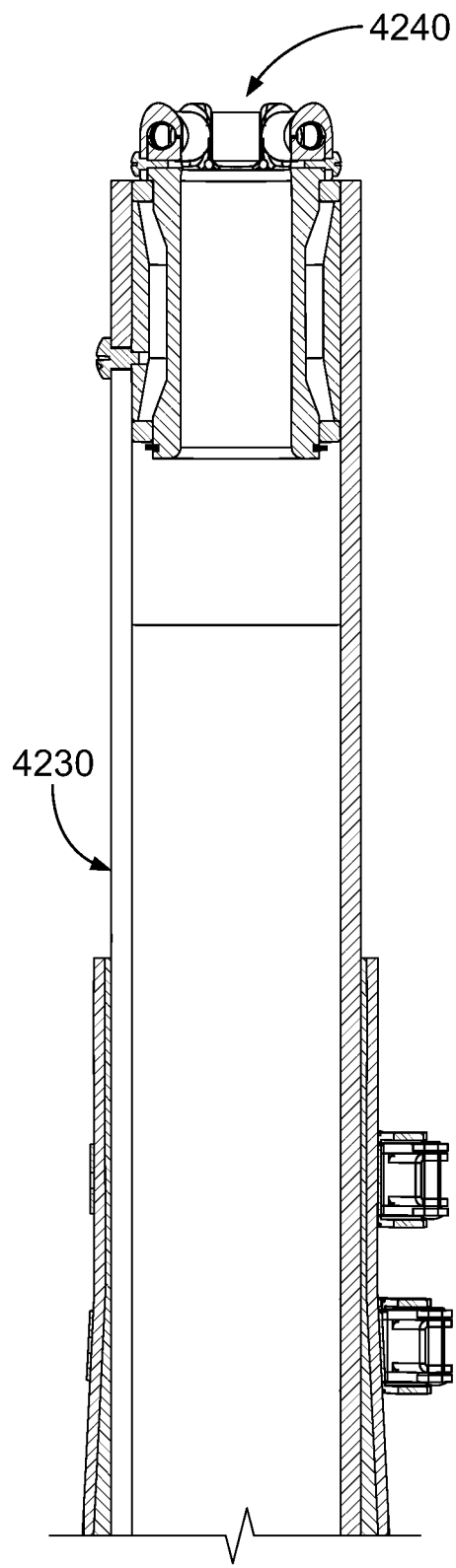
FIG. 4F is a cross-sectional view of an upper portion of the articulatable monopole assembly of the aircraft retrieval device of FIG. 4A taken substantially along a midline of the articulatable monopole assembly.
Figure 4H:
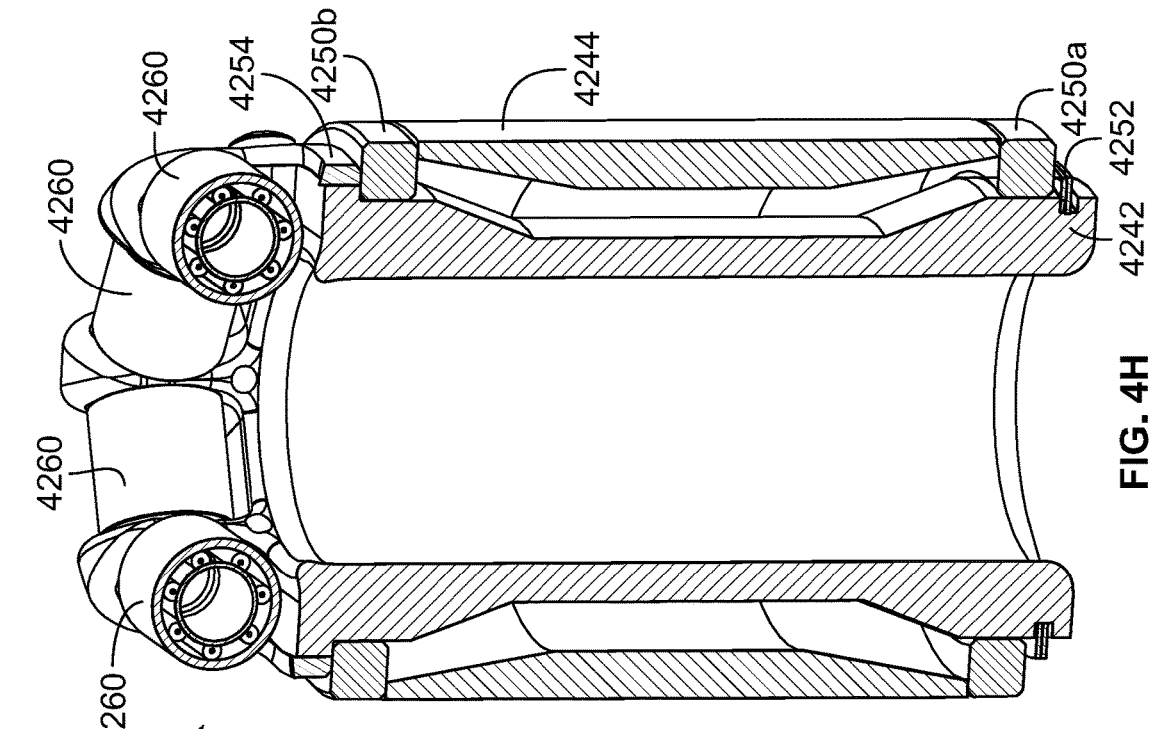
FIG. 4H is a cross-sectional view of the upper guiding sealing component of FIG. 4G taken substantially along line 4H-4H of FIG. 4G.
Figure 4G:
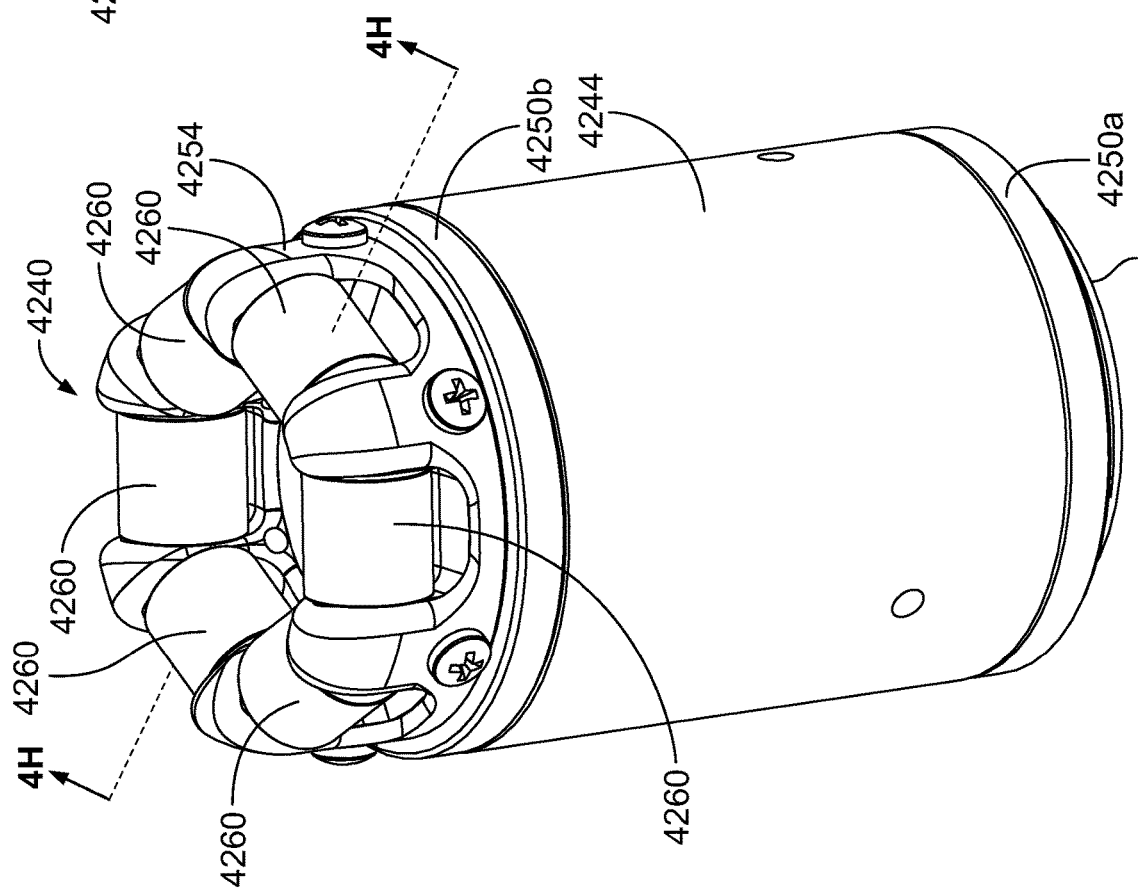
FIG. 4G is a top perspective view of an upper guiding sealing component of the articulatable monopole assembly of FIG. 4F.

The illustrated example upper guiding component 4240 is coupled to the upper mast segment 4230. As best shown in FIGS. 4E, 4F, and 4G, the upper guiding component 4240 includes a tubular body 4242, a tubular mounting element 4244, lower and upper roller bearings 4250a and 4250b, a retaining element 4252, a needle bearing supporter 4254, and multiple needle bearings 4260.

The illustrated example body 4242 defines a cylindrical interior surface that forms a flexible capture member receiving bore therethrough. The mounting element 4244 surrounds part of the body 4242. The upper roller bearing 4250b surrounds part of the body 4244 and is positioned between an upper surface (not labeled) of the mounting element 4244 and a lip (not labeled) of the body 4242. The lower roller bearing 4250a surrounds part of the body 4242 and is positioned between a lower surface (not labeled) of the mounting element 4244 and the retaining element 4252, which is disposed within a channel defined around the circumference of the body 4242. The retaining element 4252 retains the body 4242, the mounting element 4244, and the roller bearings 4250a and 4250b in place relative to one another. The needle bearing supporter 4254 is attached to the body 4242 via fasteners, and the needle bearings 4260 are rotatably attached to the needle bearing supporter 4254 such that they can rotate relative to the needle bearing supporter 4254.

The illustrated example mounting element 4244 of the upper guiding component 4240 is fixedly attached to the upper mast segment 4230 of the upstanding pole structure 4200. After attachment, the roller bearings 4250a and 4250b enable the body 4242 and the attached needle bearing supporter 4254 and needle bearings 4260 to rotate together about the longitudinal axis of the body 4242.

5. Flexible Capture Member

The flexible capture member 5000 is used to facilitate retrieval of the fixed-wing aircraft 20 from free, wing-borne flight and to retrieve the multi-copter 10 after fixed-wing aircraft launch and retrieval. The flexible capture member 5000 may be a rope (such as a Spectra rope) or other similar element. In the embodiment shown in the figures, the flexible capture member 5000 includes a multi-copter connection portion 5100 connected to (such as tied to or integrally formed with) a fixed-wing aircraft retrieval portion 5200. The multi-copter connection portion 5200 and/or the fixed-wing aircraft retrieval portion 5200 may be configured to stretch or lengthen in response to an impact from the fixed-wing aircraft contacting the flexible capture member 5000, as shown in FIG. 5B.

6. Methods of Operation

As described in detail below, the multi-copter 10, the storage assembly 2000, the downhaul winch 3000, the articulatable monopole assembly 4000, and the flexible capture member 5000 are usable to retrieve the fixed-wing aircraft 20 from free, wing-borne flight. An example multi-copter-assisted fixed-wing aircraft retrieval method is described below as being conducted from the ground. However, it should be appreciated that the present disclosure contemplates that the multi-copter-assisted fixed-wing aircraft retrieval method described herein may be conducted from any suitable moving or stationary object, including boats, ships, trailers, and more.

FIGS. 5A-5D diagrammatically show retrieval of the fixed-wing aircraft 20 from free, wing-borne flight via use of the multi-copter 10, the storage assembly 2000, the downhaul winch 3000, the articulatable monopole assembly 4000, and the flexible capture member 5000.

To retrieve the fixed-wing aircraft 20 from free, wing-borne flight, the operator positions the storage assembly 2000 at a retrieval location, and assembles the articulatable monopole assembly 4000 as shown in FIG. 4A. The operator extends the flexible capture member 5000 from the downhaul winch 3000 through the articulatable monopole assembly 4000, such that the flexible capture member extends out of a top of the articulatable monopole assembly 4000 through the upper guiding member 4240. The operator then removably attaches the flexible capture member 5000 to the multi-copter 10. The multi-copter 10 is then flown up into the air, such that the flexible capture member extends upwardly from the articulatable monopole assembly 4000, providing a target for the fixed-wing aircraft to hit in order to be captured and retrieved.

The downhaul winch may provide a resistive force to remove the slack from the flexible capture member 5000, and to maintain a set tension on the flexible capture member 5000 prior to, during, and/or after the fixed-wing aircraft makes contact with the flexible capture member 5000. This may be done via a hydraulic system coupled to the downhaul winch 3000.

Figure 5A:
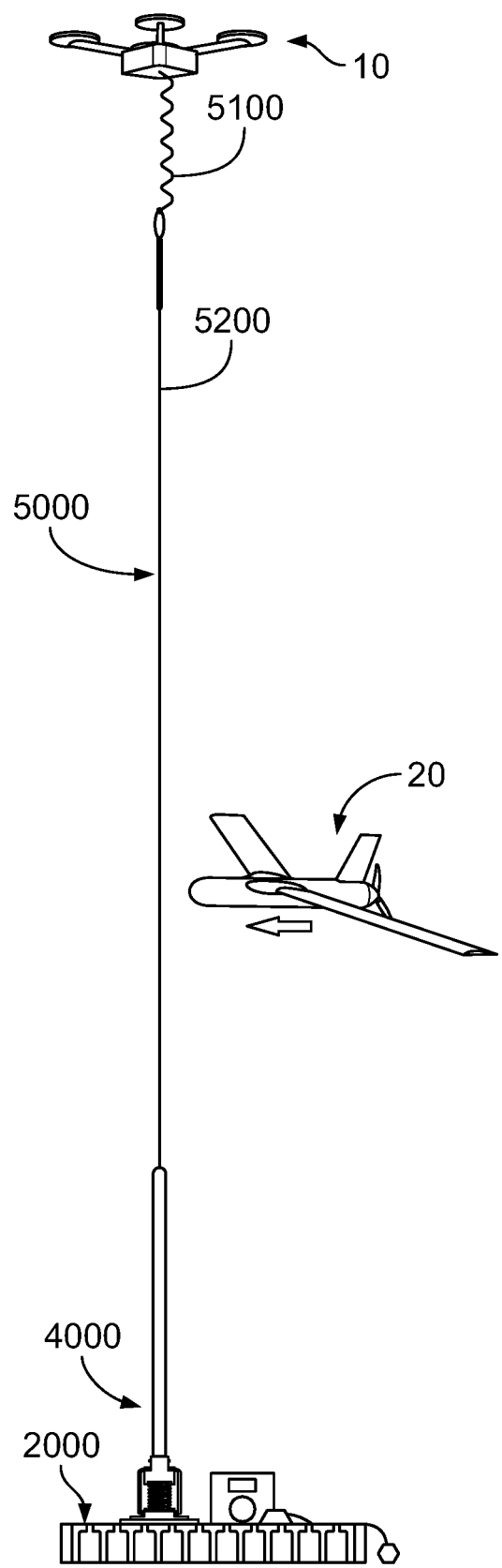
FIG. 5A is a diagrammatic view of the multi-copter and fixed-wing aircraft of FIG. 1A, and the aircraft retrieval device of FIG. 4A, shown just before the fixed-wing aircraft captures the flexible capture member.
Figure 5C:
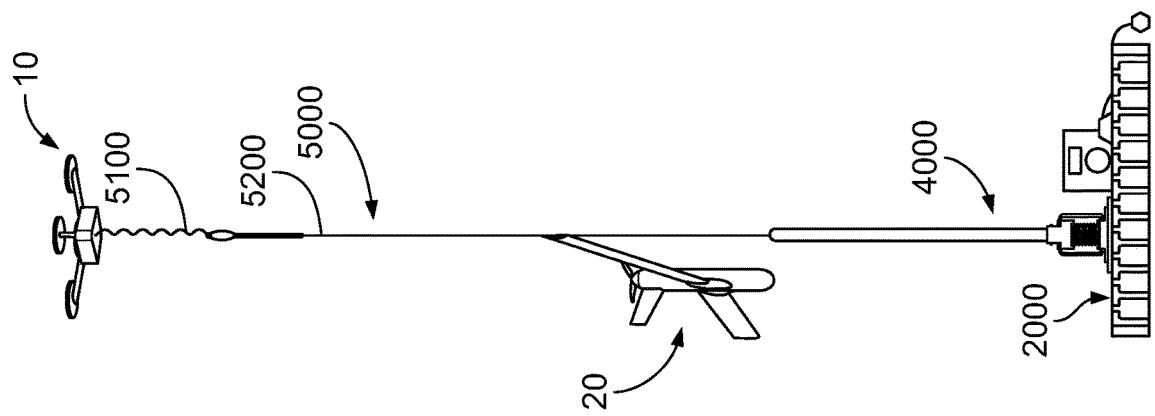
FIG. 5C is a diagrammatic view of the multi-copter and fixed-wing aircraft of FIG. 1A, and the aircraft retrieval device of FIG. 4A, shown after the fixed-wing aircraft has stopped moving sideways and the downhaul winch has retracted a portion of the flexible capture member, and shown supported by one of the storage assemblies of the present disclosure.
Figure 5B:
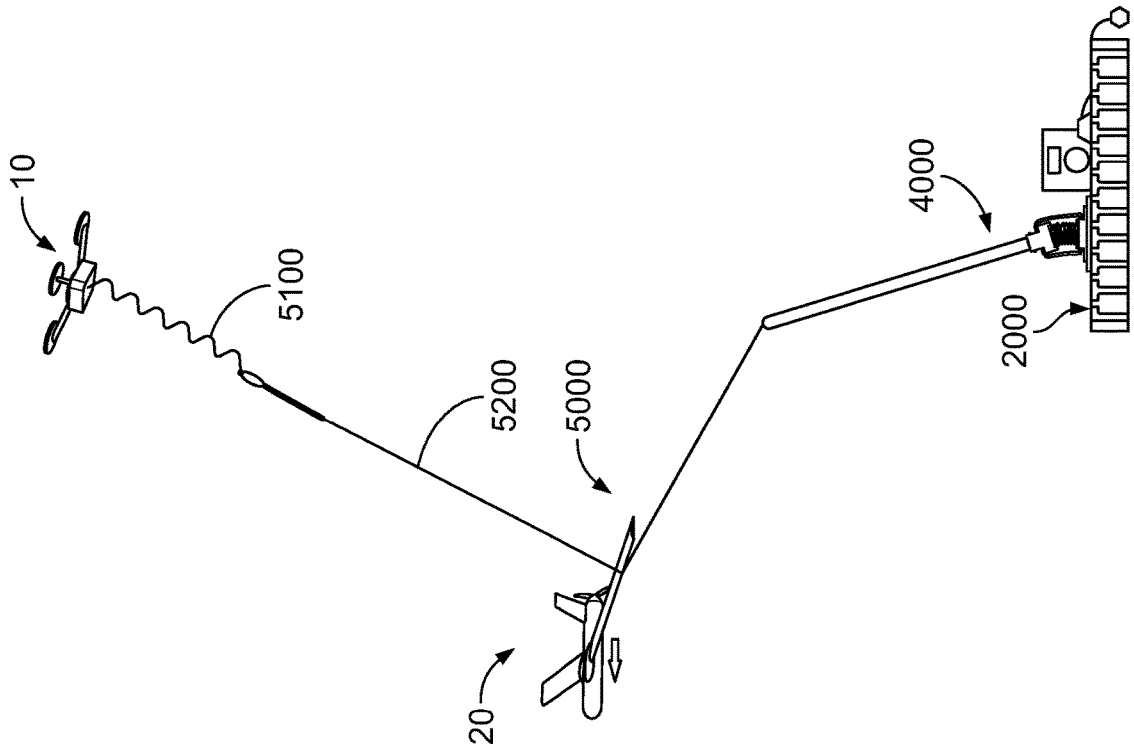
FIG. 5B is a diagrammatic view of the multi-copter and fixed-wing aircraft of FIG. 1A, and the aircraft retrieval device of FIG. 4A, shown just after the fixed-wing aircraft captures the flexible capture member, illustrating how the articulatable monopole assembly articulates to reduce the overturning moment of the base, and showing that the articulatable monopole assembly has absorbed at least part of the impact force from the fixed-wing aircraft without toppling, and shown supported by one of the storage assemblies of the present disclosure.
Figure 5D:
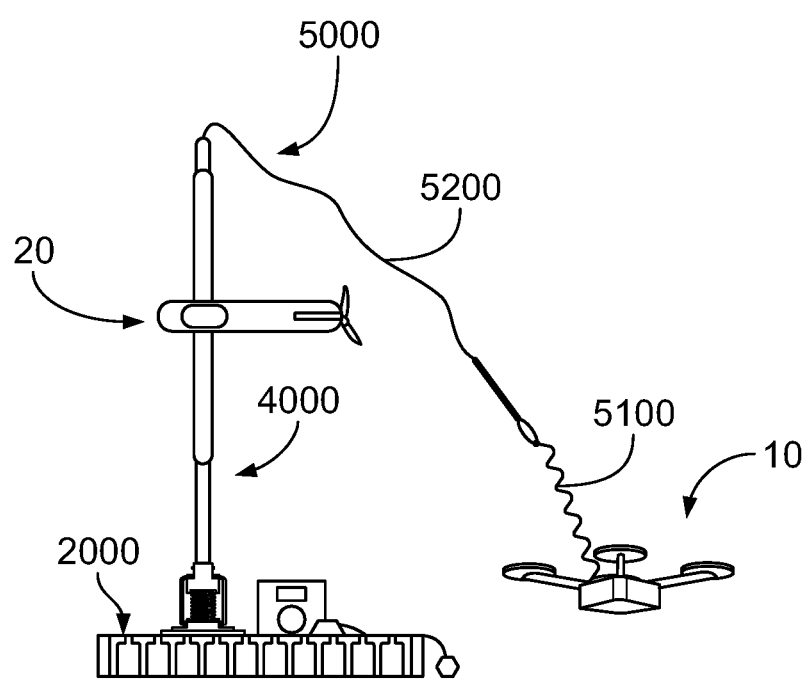
FIG. 5D is a diagrammatic view of the multi-copter and fixed-wing aircraft of FIG. 1A, and the aircraft retrieval device of FIG. 4A, shown after the fixed-wing aircraft has been lowered safely to the monopole assembly and the multi-copter has landed, and shown supported by one of the storage assemblies of the present disclosure.

As shown in FIG. 5A, the multi-copter 10 either automatically or via operator control executes a station-keeping operation relative to the articulatable monopole assembly 4000. The fixed-wing aircraft is controlled to contact and capture the flexible capture member 5000 which extends between the articulatable monopole assembly 4000 and the multi-copter 10.

The impact of the fixed-wing aircraft 20 on the flexible capture member propagates through the flexible capture member into both the multi-copter 10 and the articulatable monopole assembly 4000. If the force is great enough (i.e., a large enough moment is exerted on the articulatable monopole assembly), it causes the articulatable monopole assembly to bend at the articulating joint 4100, which enables the articulatable monopole assembly 4000 to absorb the force without tipping the articulatable monopole assembly 4000 and storage assembly 2000 over. Some of the force is also propagated into the multi-copter, which absorbs the force by moving sideways in the direction of the imparted force. As noted above, the use of the articulating joint 4100 of the articulatable monopole assembly 4000 enables the fixed-wing aircraft to contact the flexible capture member at a lower position, closer to the articulatable monopole assembly 4000 than the multi-copter 10. This enables the articulatable monopole assembly 4000 to absorb a much larger force relative to the multi-copter, such that the multi-copter does not need to expend as much energy to remain in position above the articulatable monopole assembly 4000. As such, a less powerful multi-copter can be used, and less battery power or fuel is needed.

After capture of the fixed-wing aircraft, the multi-copter operator controls the multi-copter 10 to descend toward the articulatable monopole assembly 4000. As the multi-copter is lowered, the downhaul winch 3000 winds the flexible capture member to maintain tension. This continues until the fixed-wing aircraft 20 has reached the top of the articulatable monopole assembly, and is at rest (e.g., FIG. 4A). The multi-copter 10 can be lowered to the ground and the fixed-wing aircraft can then be removed from the flexible capture member 5000. After landing, the multi-copter operator shuts the multi-copter 10 down, detaches the flexible capture member 5000 from the multi-copter 10, and removes the multi-copter 10 to a hangar (or other suitable area) for disassembly and storage.

7. Additional Example Embodiments

FIGS. 6A-6E illustrate a second example embodiment of the aircraft retrieval device, the downhaul winch 13000, the monopole assembly 14000, the flexible capture member 15000, and the outrigger supports 16000A and 16000B, as well as an example storage assembly 12000 of the present disclosure.

The storage assembly 12000 may be similar or identical to the storage assembly 2000 described above in one or more respects. Storage assembly 12000 is configured to store various components of the aircraft retrieval system, including the downhaul winch 13000, parts of the monopole assembly 14000 including the articulating joint 14100 and the upstanding monopole structure 14200, the flexible capture member 15000, and the outrigger supports 16000A and 16000B. Furthermore, the storage assembly 12000 is configured to act as a base to support the aircraft retrieval assembly, and specifically the monopole assembly, during operation. As illustrated in FIGS. 6A-6E, the monopole assembly is attached to the storage assembly 12000 at a first end. The outriggers 16000A and 16000B are rotated and extended radially outward from the monopole assembly 14000 and storage assembly 12000, such that a tripod of support for the monopole assembly 14000 is formed by the storage assembly 12000, first outrigger support 16000A, and second outrigger support 16000B.

The downhaul winch 13000 may be similar or identical to the downhaul winch 3000 described above. For simplicity, the description of the downhaul winch 13000 will not be repeated in this section.

The example monopole assembly 14000 includes: (1) an articulating joint 14100, and (2) an upstanding pole structure 14200.

The illustrated example articulating joint 14100 includes: (1) a joint base 14110, (2) a spring 14140, (3) an upper coupling assembly 14160, and (4) a plurality of ligaments 14190. The illustrated example joint base 14110 includes a lower joint plate 14112 and a plurality of lower ligament connectors 14122. Various components or features of the aircraft retrieval device shown in FIGS. 6A-6E are similar or identical to the components and features described above. For example, the joint base 14110 may be similar or identical to the joint base 4110, the spring 14140 may be similar or identical to spring 4140, and the upper coupling assembly 14160 may be similar or identical to the upper coupling assembly 4160. The components shown in FIGS. 6A-6E may have differences as well. For example, the upper ligament connectors 14182 shown in FIG. 6C extend radially outward from the upper coupling assembly 14160, while the upper ligament connectors 4182 shown in FIG. 4D extend in an upward direction. Various other differences will be apparent from the Figures.

The illustrated example upstanding pole structure 14200 includes a lower mast segment 14210, a middle mast segment 14220 (surrounded at least partially by padding 14222), an upper mast segment 14230, and an upper guiding component 14240. Various components of the upstanding monopole structure 14200 may be similar or identical to the upstanding monopole structure 4200, and for simplicity are not described again in this section.

Figure 6A:
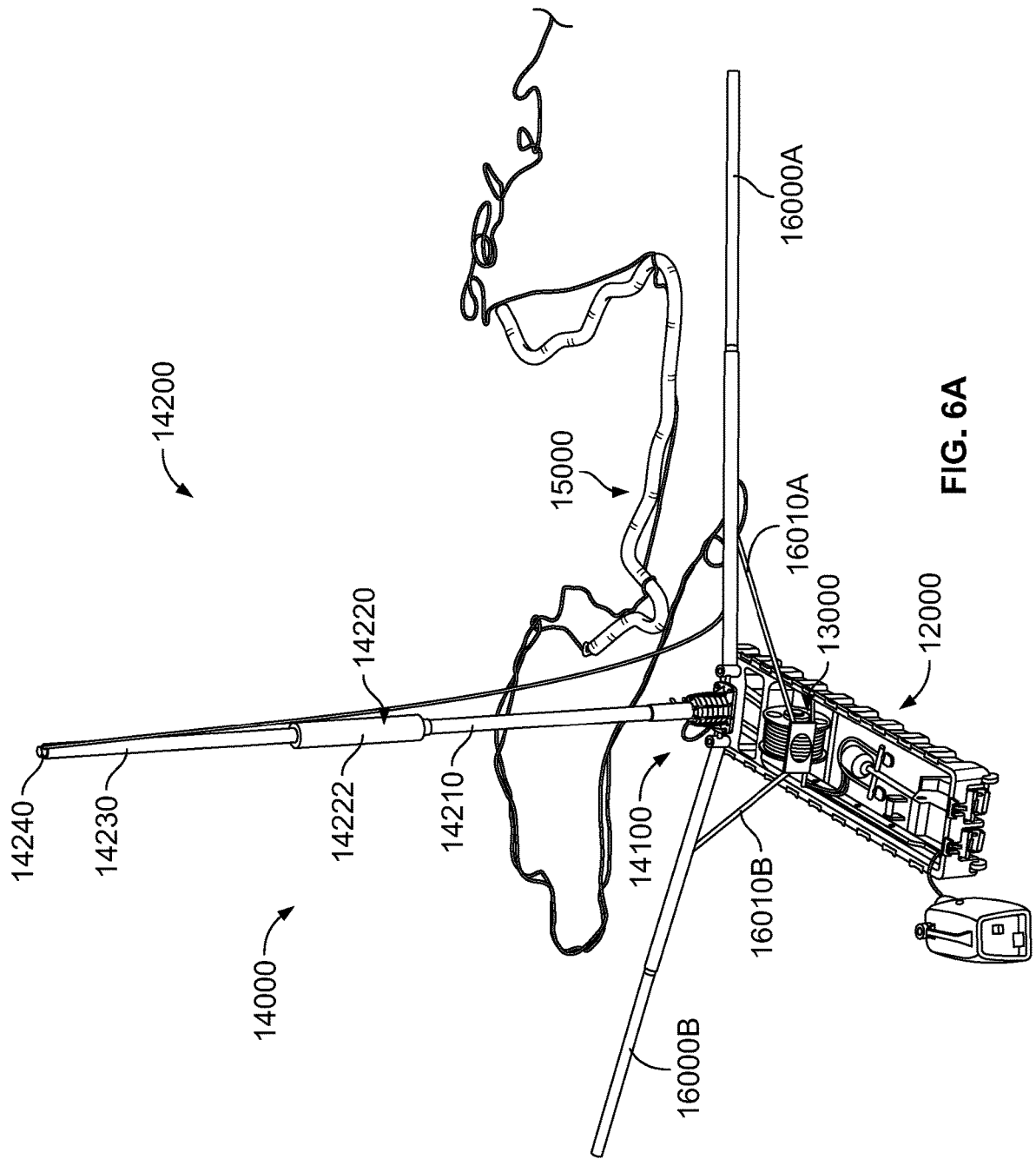
FIG. 6A is a perspective view of an example aircraft retrieval device of another example embodiment of the present disclosure and shown supported by one of the storage assemblies of the present disclosures.
Figure 6C:
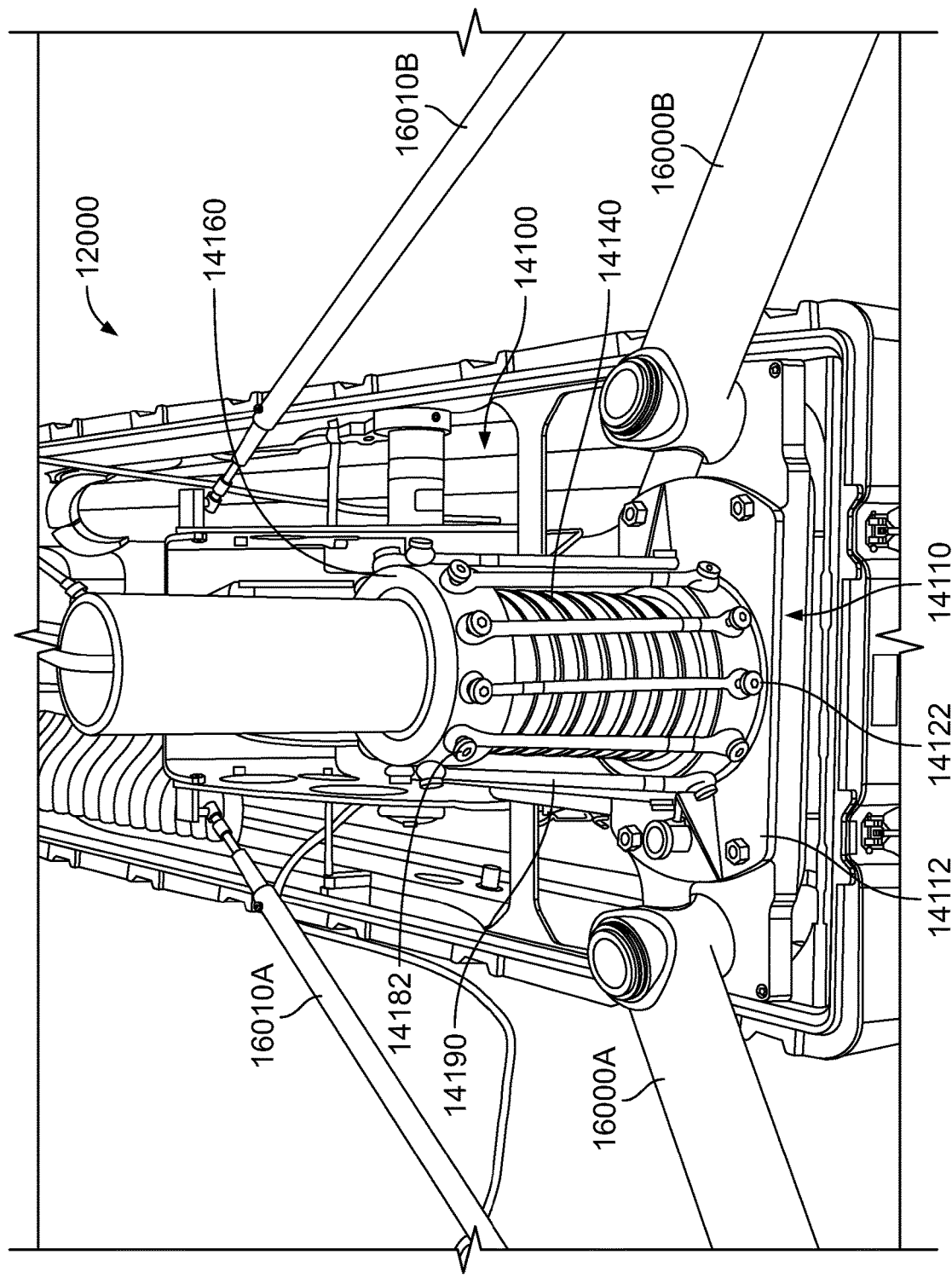
FIG. 6C is an enlarged perspective view of a base of the monopole assembly of the aircraft retrieval device of FIG. 6A and shown supported by one of the storage assemblies of the present disclosure.
Figure 6D:
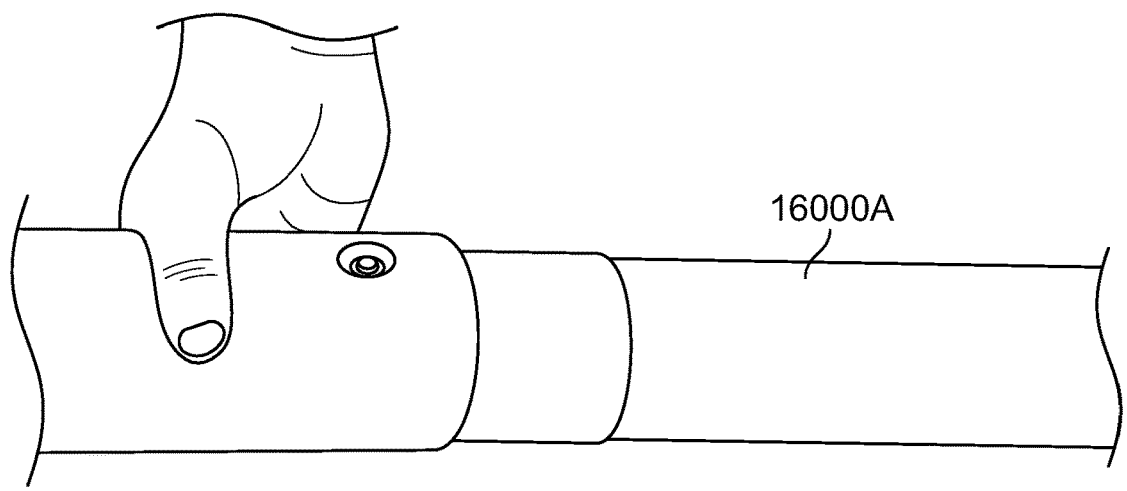
FIG. 6D is an enlarged side perspective view of the connection between two sections of an outrigger of the aircraft retrieval device of FIG. 6A.
Figure 6E:
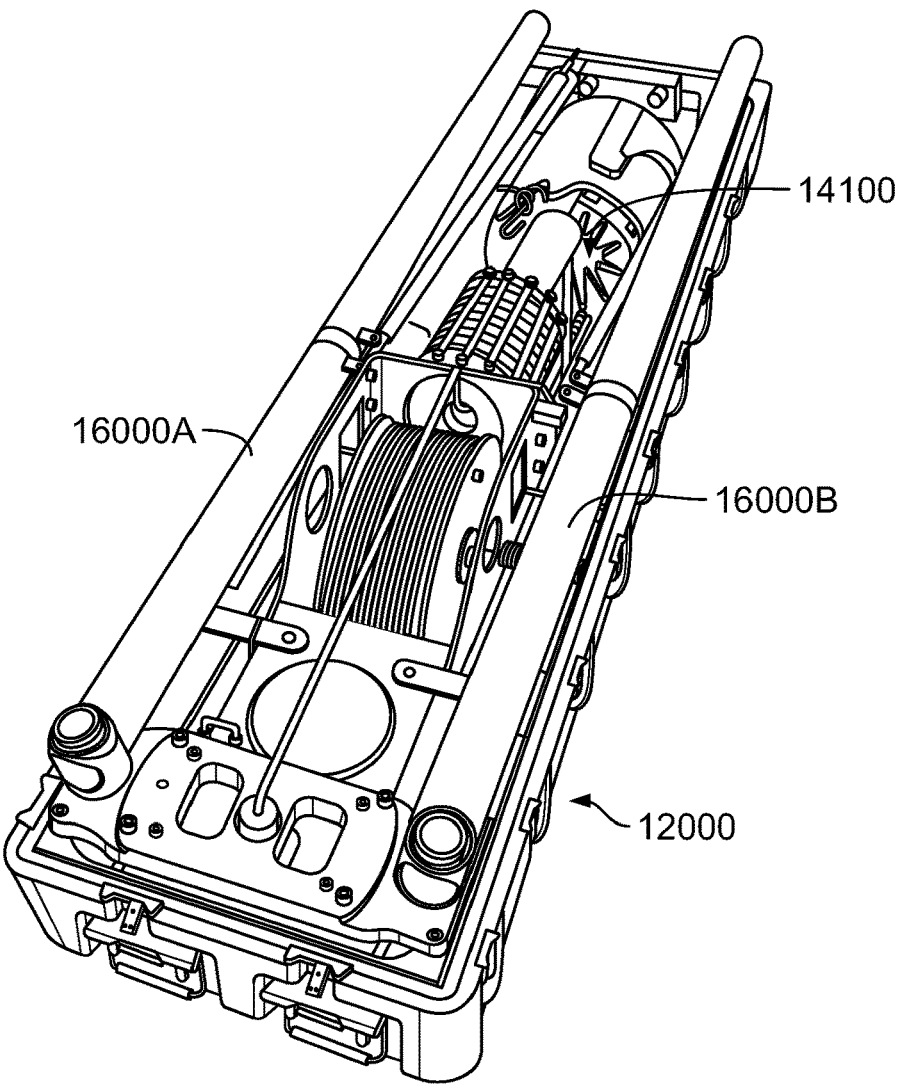
FIG. 6E is a perspective view of the example aircraft retrieval device of FIG. 6A shown in and supported by one of the storage assemblies of the present disclosure.

Flexible capture member 15000, shown in FIG. 6A, may be similar or identical to flexible capture member 5000 described above.

The example embodiment shown in FIG. 6A-6E includes first and second outrigger supports 16000A and 16000B, which enable a larger footprint for the base of the aircraft retrieval system to lower the risk of tipping over during operation. The outrigger supports 16000A and 16000B are comprised of multiple sections that are attachable together. In certain example embodiments, such as the example shown in FIG. 6D, the sections of each outrigger support are fully detachable from each other. Alternatively, the multiple sections may be connected in a telescopic manner, such that a first section slides into and out of a second section. The outrigger supports 16000A and 16000B may be rotatably attached to the storage assembly 12000, as shown in FIGS. 6A, 6B, 6C, and 6E. The outrigger supports 16000A and 16000B may be configured to rotate from a storage position shown in FIG. 6E, to an operational position shown in FIGS. 6A, 6B, and 6C. Each outrigger support includes a first end rotatably attached to the storage assembly 12000, and as second end that extends outward from the storage assembly 12000 such that a tripod is formed. Each outrigger support 16000A and 16000B also includes a secondary support member 16010A and 16010B that is attachable to the outrigger support at a first end, and to the storage assembly 12000 at a second end. This provides additional stability to the outrigger supports.

FIGS. 7A-7D illustrate additional features of various embodiments of the present disclosure. In particular, FIGS.

7A-7D illustrate an example castellated masthead 7000 and an example mid-mast pad 8000.

The example castellated masthead 7000 includes a cylindrical base 7100 and a plurality of upstanding triangular portions 7200A-C. The cylindrical base 7100 is suitably attached to the top of the upstanding monopole structure (e.g., such as monopole structure 4200 or monopole structure 14200). The flexible capture member is extendible through a center hole 7010 of the castellated masthead 7000.

Figure 7A:
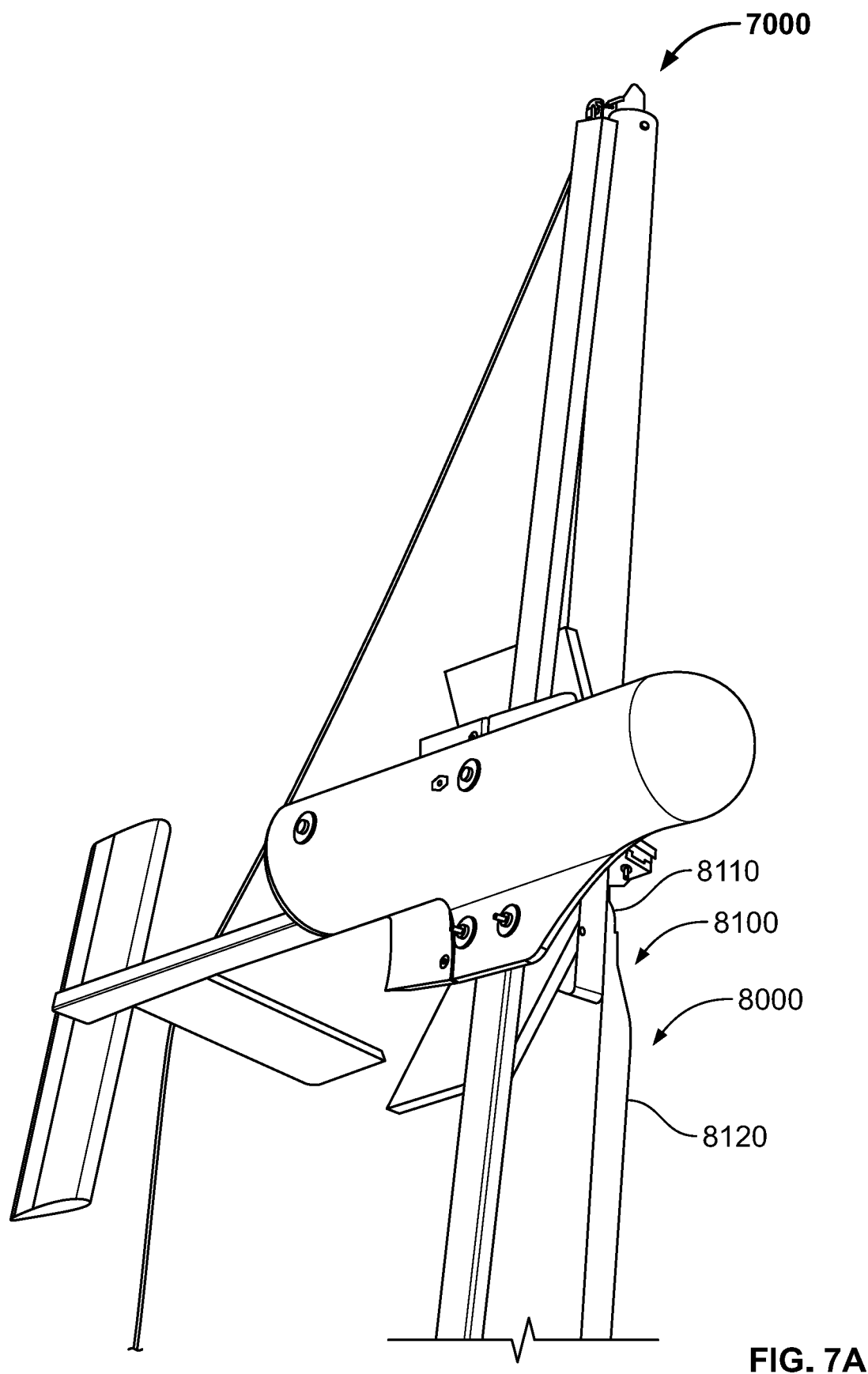
FIG. 7A is a fragmentary perspective view of a top portion of an example monopole assembly that has captured mocked-up fixed-wing aircraft, the monopole assembly including a castellated masthead according to another example embodiment of the present disclosure.
Figure 7B:
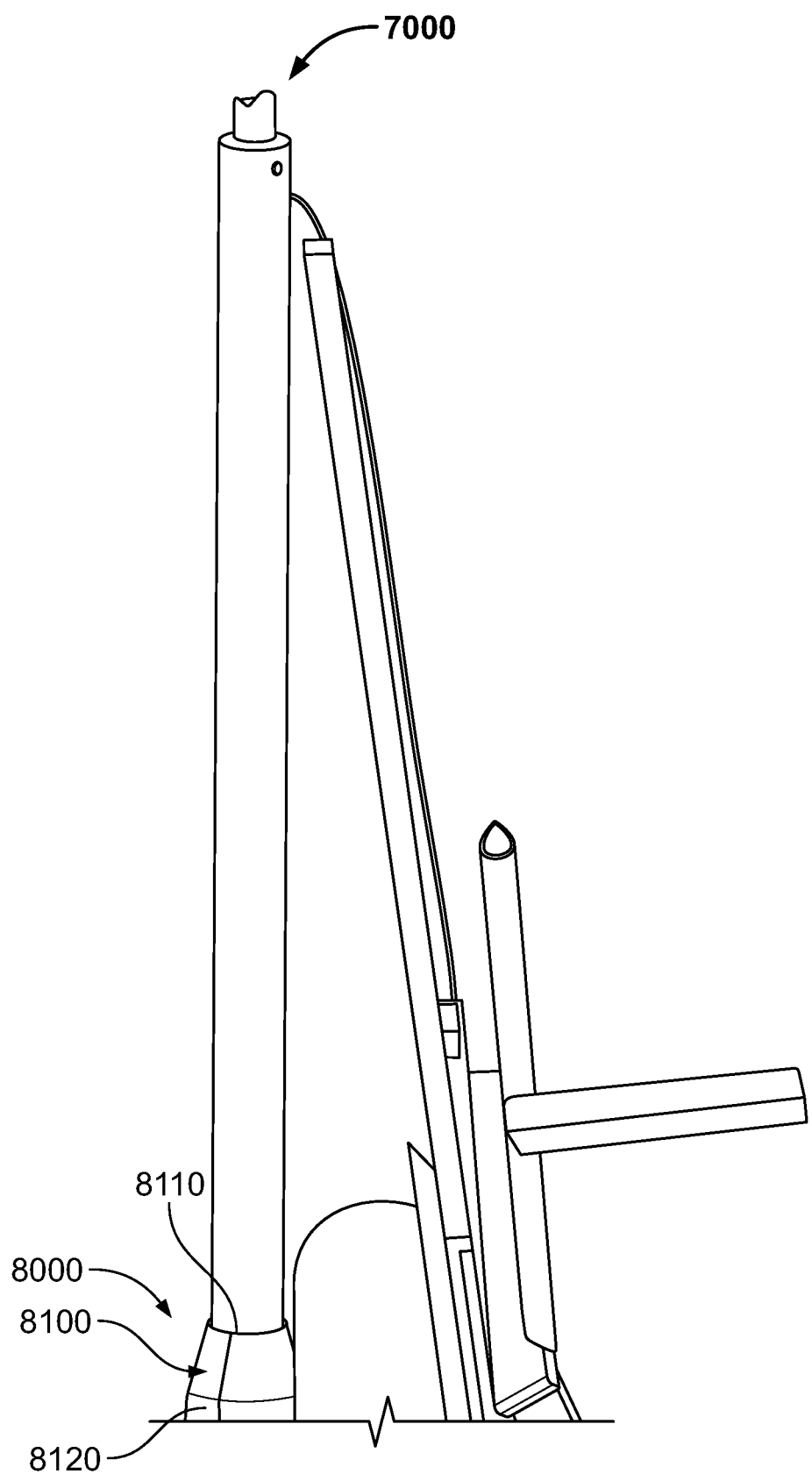
FIG. 7B is a fragmentary perspective view of the monopole assembly including the castellated masthead of FIG. 7A, and showing part of the captured mocked-up fixed-wing aircraft.
Figure 7C:
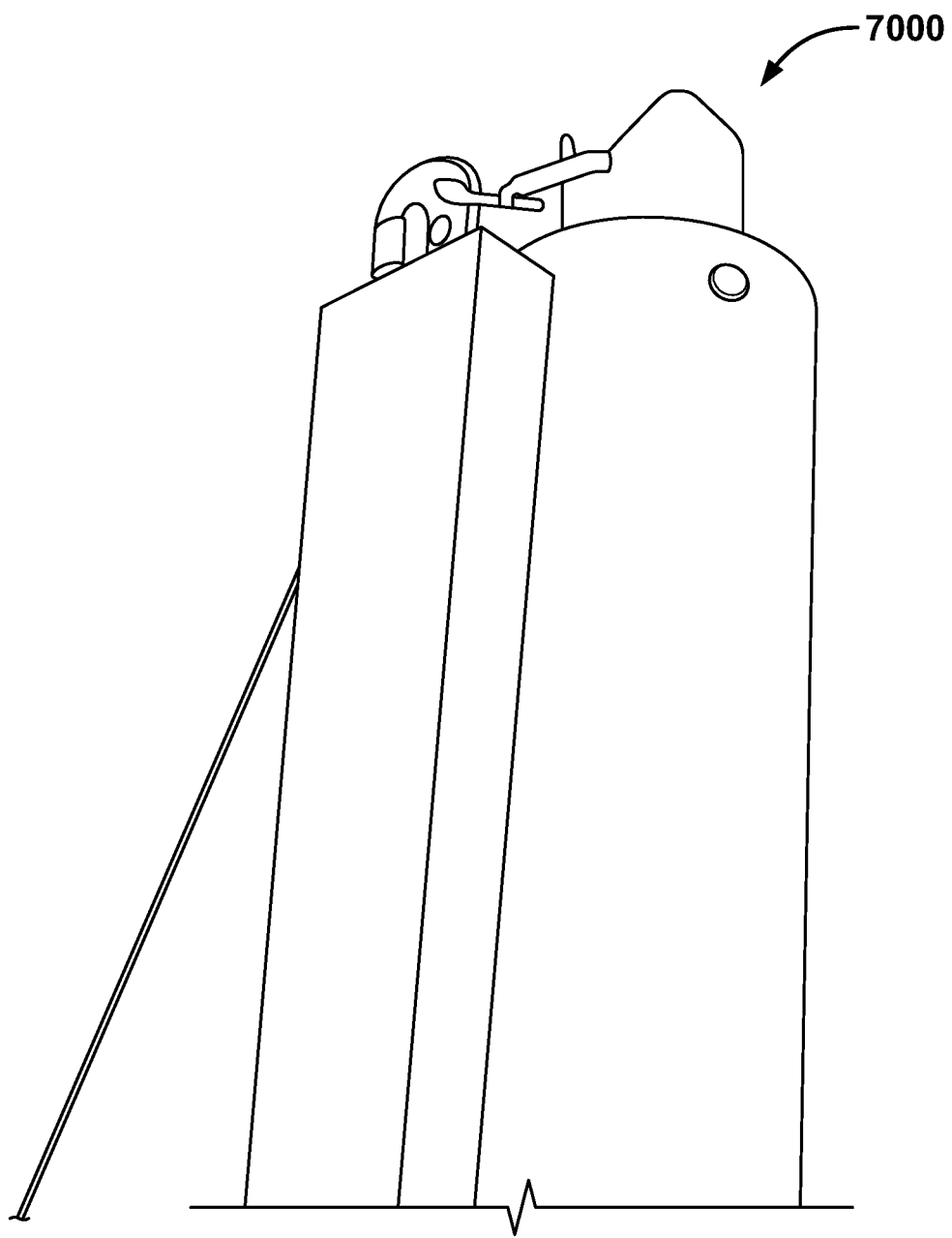
FIG. 7C is an enlarged fragmentary perspective view of the castellated masthead attached to the top of the monopole assembly of FIG. 7A.
Figure 7D:
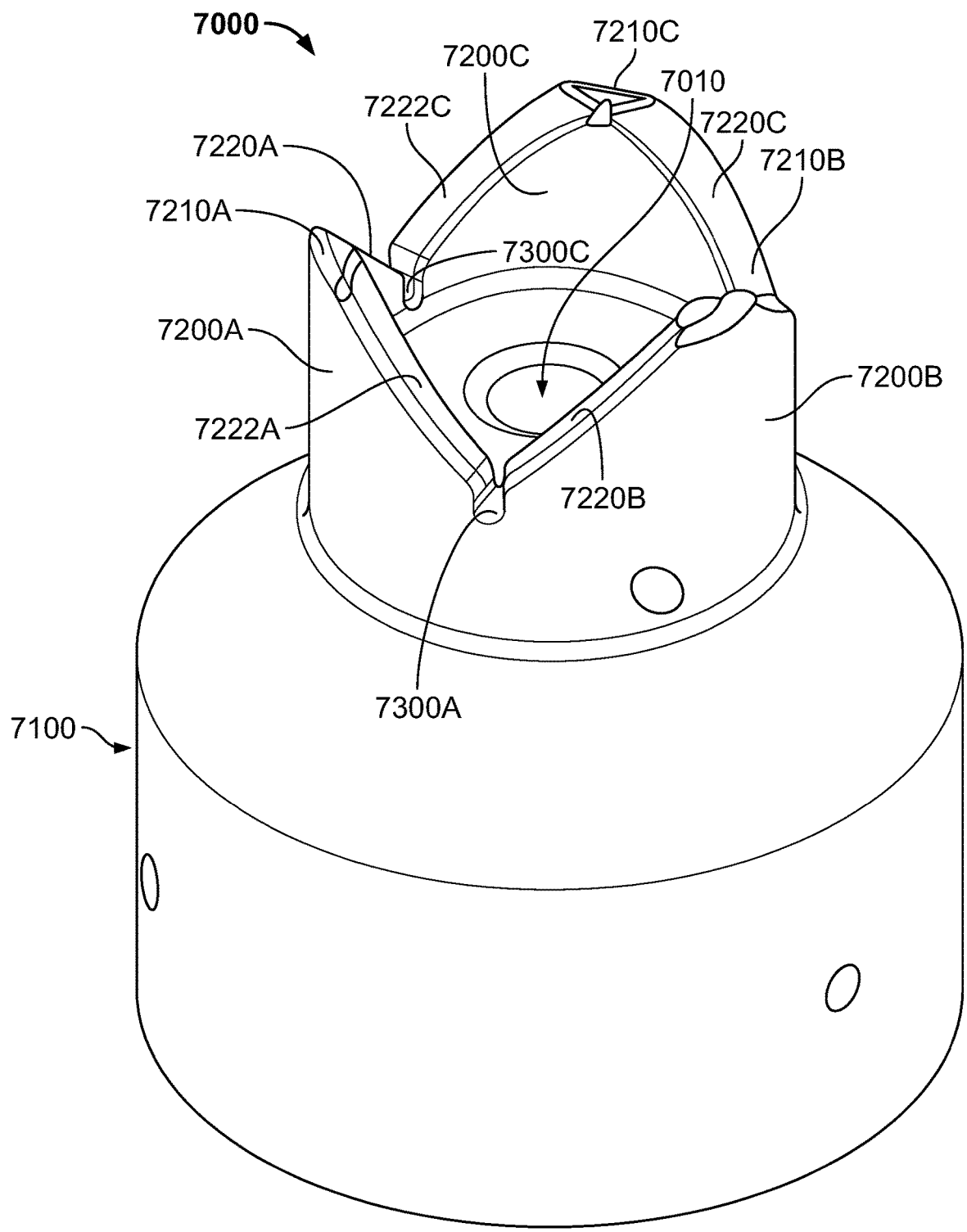
FIG. 7D is a perspective view of the castellated masthead of FIG. 7A.

The upstanding triangular portions 7200A-C are curved such that together they form a cylindrical upper portion of the castellated masthead 7000, as shown in FIG. 7D. While the castellated masthead 7000 is illustrated having three upstanding triangular portions 7200A-C, it should be understood that two, four, or some other quantity of upstanding triangular portions can be used. Further, while the upstanding triangular portions are illustrated as being triangular in shape, is should also be understood that other suitable shapes may be used as well. Each upstanding triangular portion includes a rounded or flattened apex 7210A-C, and two side edges 7220A-C and 7222A-C. The side edges of adjacent upstanding triangular portions point or extend toward slots 7300A-C.

The portions that define the slots 7300A-C are sized to grip the flexible capture member that extends through the center hole 7010. During the capture process, after the fixed-wing aircraft engages the capture member, the fixed-wing aircraft is held aloft by, for example, a multi-copter. As the multi-copter lowers the fixed-wing aircraft down toward the monopole assembly, the flexible capture member is reeled in. At a certain point in this process, the fixed-wing aircraft is lowered down below the height of the monopole structure, and any further lowering of the fixed-wing aircraft would cause the flexible capture member to pay out from the winch. At this point, the fixed-wing is supported by the monopole structure and flexible capture member. The flexible capture member connected to the fixed-wing aircraft hanging down from monopole structure is guided into and caught in one of the slots 7300A-C. Friction between the flexible capture member and portions that define the respective slot causes the flexible capture member to remain caught in the slot, and the fixed-wing aircraft is thereafter supported by the monopole structure without the need for high tension on the flexible capture member by the winch. This enables the winch to be set at a tension that is less than the weight of the fixed-wing aircraft, and still be able to hold the fixed-wing aircraft off the ground when the fixed-wing aircraft is supported by the monopole structure as shown in FIGS. 7A-C.

FIGS. 7A and 7B illustrate a second embodiment of the padding surrounding a portion of the upstanding monopole structure. This padding is shown as padding 8000 in FIGS. 7A and 7B. Padding 8000 includes a conical upper surface 8100 that enables the fixed wing aircraft to slide down alongside the upstanding monopole structure, without snagging or getting caught on the upper surface of the padding 8000. The upper surface of the padding is conical with a minor diameter 8110 above a major diameter 8120, wherein the minor diameter 8110 is matched to the outer diameter of the upstanding monopole structure, and wherein the major diameter 8120 is matched to the outside diameter of the padding 8000.

8. Example Variations

The examples disclosed herein are described using a multi-copter to carry one end of the flexible capture member to a predetermined height, such that the fixed-wing aircraft can make contact with the flexible capture member below the height of the multi-copter. However, it should be appreciated that a different system, vehicle, or other device may be used to hold the first end of the flexible capture member aloft. For example, embodiments of the present disclosure may instead use a crane, boom, aircraft (either fixed-wing or not), parachute, balloon, or other element to provide a high point for the flexible capture member.

Various changes and modifications to the presently preferred embodiments described herein will be apparent to those skilled in the art. For example, in certain scenarios, it may be beneficial to route the flexible capture member along the outside of the monopole, like a fishing rod, rather than concentrically within the diameter of the monopole.

Further, the downhaul winch may be replaced by an alternative tensioning device, such as a bungee, piston, or falling weight.

These changes and modifications can be made without departing from the spirit and scope of the present subject matter and without diminishing its intended advantages. It is intended that such changes and modifications be covered by the appended claims.

The invention claimed is:

1. An aircraft retrieval device comprising:
a flexible capture member couplable to a lifting device on a first end, the lifting device configured to raise the first end of the flexible capture member to a predetermined height;
a tensioning device, couplable to a second end of the flexible capture member;
a monopole assembly configured such that the flexible capture member can extend longitudinally through the monopole assembly; and
an upper guiding component configured to guide the flexible capture member at an area where the flexible member exits an upper end of the monopole assembly.

2. The aircraft retrieval device of claim 1, wherein the monopole assembly is an articulatable monopole assembly.

3. The aircraft retrieval device of claim 1, wherein the monopole assembly includes an articulating joint and an upstanding monopole structure.

4. The aircraft retrieval device of claim 3, wherein the articulating joint is preloaded to a predetermined value based on a weight of (i) a monopole base structure and footprint, (ii) windage, and (iii) an aircraft to be supported by the monopole structure.

5. The aircraft retrieval device of claim 4, wherein the articulating joint is preloaded to the predetermined value based on an impact force expected from an aircraft impacting the flexible capture member.

6. The aircraft retrieval device of claim 3, wherein the articulating joint includes a steel coil spring.

7. The aircraft retrieval device of claim 6, wherein the articulating joint includes a plurality of fibrous rope ligaments configured to preload the spring to a predetermined value.

8. The aircraft retrieval device of claim 1, further including a storage assembly including a monopole mounting assembly configured to support the monopole assembly.

9. The aircraft retrieval device of claim 8, wherein the monopole mounting assembly is configured to fit in the storage assembly.

10. The aircraft retrieval device of claim 1, wherein the monopole assembly includes an upstanding monopole structure that includes a plurality of removably attached mast segments.

11. The aircraft retrieval device of claim 10, wherein the plurality of removably attached mast segments are configured to fit in a storage assembly.

12. The aircraft retrieval device of claim 1, wherein the monopole assembly includes an upstanding monopole structure that includes padding configured to protect the upstanding monopole structure and a captured aircraft supported by the monopole assembly.

13. The aircraft retrieval device of claim 12, wherein an upper surface of the padding is conical, with a minor diameter above a major diameter, and wherein the minor diameter is matched to an outer diameter of the upstanding monopole structure, and wherein the major diameter is matched to an outside diameter of the padding.

14. The aircraft retrieval device of claim 1, wherein the tensioning device is a downhaul winch.

15. The aircraft retrieval device of claim 1, wherein the tensioning device is regulated to payout when tension exceeds a predetermined upper limit, wherein the predetermined upper limit is based on a risk of capsize.

16. The aircraft retrieval device of claim 1, wherein the tensioning device is regulated such that a static weight of the captured fixed-wing aircraft is held against gravity when the fixed-wing aircraft is supported by the monopole assembly.

17. The aircraft retrieval device of claim 1, including a castellated masthead configured with portions that define slots sized to receive the flexible capture member as a weight of the fixed-wing aircraft transfers to the monopole structure, such that one or more of the portions can grip the flexible capture member.

18. The aircraft retrieval device of claim 1, wherein the monopole structure is composed of a lightweight material including fiber-reinforced plastic, aluminum or titanium.

19. The aircraft retrieval device of claim 1, wherein the monopole structure is composed of a non-conductive material including fiberglass reinforced plastic.

20. The aircraft retrieval device of claim 1, wherein the monopole assembly is configured to support a fixed-wing aircraft, and wherein a height of the monopole assembly is larger than a wingspan of the fixed-wing aircraft.

21. An aircraft retrieval device comprising:
a flexible capture member couplable to a lifting device on a first end, the lifting device configured to raise the first end of the flexible capture member to a predetermined height;
a tensioning device, couplable to a second end of the flexible capture member;
a monopole assembly comprising an articulating joint and an upstanding monopole structure;
a plurality of outrigger supports configured to support the articulating joint of the monopole assembly; and
an upper guiding component configured to guide the flexible capture member with respect to the monopole assembly.

22. The aircraft retrieval device of claim 21, wherein the outrigger supports include telescopic tubes.

23. The aircraft retrieval device of claim 21, further including a storage assembly base which, in combination with the outrigger supports, supports the articulating joint of the monopole assembly.

24. An aircraft retrieval device comprising:
a flexible capture member couplable to a lifting device on a first end of the flexible capture member;
a tensioning device couplable to a second end of the flexible capture member;
a monopole assembly; and
a support structure comprising:
first and second outrigger supports, and
a storage assembly,
wherein the first and second outrigger supports and the storage assembly form a tripod to support a base of the monopole assembly.

25. The aircraft retrieval device of claim 24, wherein the base of the monopole assembly is supportable by the storage assembly, and wherein the first and second outrigger supports are configured to attach to the storage assembly and extend radially outward from the base of the monopole assembly.

26. The aircraft retrieval device of claim 24, wherein each of the first and second outrigger supports includes multiple sections removably attached together to form the outrigger support.

27. An aircraft retrieval device comprising:
a flexible capture member couplable to a lifting device on a first end, the lifting device configured to raise the first end of the flexible capture member to a predetermined height;
a tensioning device couplable to a second end of the flexible capture member;
a monopole assembly including an articulating joint and an upstanding monopole structure, wherein the articulating joint includes a spring that biases the upstanding monopole structure to a center position; and
an upper guiding component configured to guide the flexible capture member with respect to the monopole assembly.

28. The aircraft retrieval device of claim 27, wherein the spring of the articulating joint biases the upstanding monopole structure to extend vertically.

* * * * *